(12) United States Patent
Nakazawa

(10) Patent No.: US 10,142,193 B2
(45) Date of Patent: Nov. 27, 2018

(54) INFORMATION PROCESSING TERMINAL, METHOD THEREFOR, AND STORAGE MEDIUM

(71) Applicant: CANON KABUSHIKI KAISHA, Tokyo (JP)

(72) Inventor: Toshiyuki Nakazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 307 days.

(21) Appl. No.: 14/276,937

(22) Filed: May 13, 2014

(65) Prior Publication Data

US 2014/0344377 A1 Nov. 20, 2014

(30) Foreign Application Priority Data

May 15, 2013 (JP) .................... 2013-103329

(51) Int. Cl.
*H04L 12/24* (2006.01)
*H04L 29/08* (2006.01)
*G06F 9/54* (2006.01)

(52) U.S. Cl.
CPC .......... *H04L 41/5083* (2013.01); *G06F 9/547* (2013.01); *H04L 67/02* (2013.01)

(58) Field of Classification Search
CPC ...... H04L 41/5083; H04L 67/02; G06F 9/547
USPC .............................................. 709/204–206
See application file for complete search history.

(56) References Cited

U.S. PATENT DOCUMENTS

| | | | | |
|---|---|---|---|---|
| 7,047,274 B2* | 5/2006 | Thomas | ................ | G05B 19/00 709/200 |
| 7,573,878 B2* | 8/2009 | Fujimori | ............. | H04Q 3/0058 370/392 |
| 2002/0015598 A1* | 2/2002 | Maeda | ............... | H04N 1/00352 399/81 |
| 2002/0104002 A1* | 8/2002 | Nishizawa | .......... | H04L 63/0428 713/168 |
| 2002/0136563 A1* | 9/2002 | Maeda | ............... | H04N 1/00352 399/81 |
| 2003/0061335 A1* | 3/2003 | Thomas | ................ | G05B 19/00 709/223 |
| 2004/0034521 A1* | 2/2004 | Kawakura | ............. | G06F 17/275 704/1 |

(Continued)

FOREIGN PATENT DOCUMENTS

CN 101299705 A 11/2008
CN 101616234 A 12/2009
(Continued)

OTHER PUBLICATIONS

Harry Brignull; "An Introduction to Web Intents—An interview with Glen Jones;" 90 Percent of Everything; Jan. 20, 2012; pp. 1-5; XP055258555.

(Continued)

*Primary Examiner* — Minh Chau Nguyen
(74) *Attorney, Agent, or Firm* — Canon U.S.A., Inc. IP Division

(57) ABSTRACT

The present invention is characterized in that, when registering function information (a Web Intent) for calling a function provided by a service in a UA, function information is registered in which at least a part of a processing content when the provided function was used previously is reflected.

26 Claims, 30 Drawing Sheets

(56) References Cited

U.S. PATENT DOCUMENTS

| | | | |
|---|---|---|---|
| 2007/0167162 A1* | 7/2007 | Kim | H04M 1/6066 455/435.1 |
| 2007/0169113 A1 | 7/2007 | Moore | |
| 2008/0275945 A1* | 11/2008 | Tanimoto | H04L 67/104 709/203 |
| 2009/0064279 A1* | 3/2009 | Ardolino | H04L 67/02 726/3 |
| 2009/0300103 A1* | 12/2009 | Matsutsuka | H04L 67/2819 709/203 |
| 2009/0323110 A1* | 12/2009 | Shiimori | G06Q 10/10 358/1.15 |
| 2010/0290456 A1* | 11/2010 | Mutikainen | H04L 29/12103 370/352 |
| 2011/0202915 A1* | 8/2011 | Kuroyanagi | G06F 8/61 717/178 |
| 2012/0110066 A1* | 5/2012 | Furuta | G06F 3/122 709/203 |
| 2012/0218599 A1* | 8/2012 | Kashioka | G06F 3/1222 358/1.15 |
| 2013/0148155 A1* | 6/2013 | Kitagata | G06F 3/1294 358/1.15 |

FOREIGN PATENT DOCUMENTS

| | | |
|---|---|---|
| CN | 102195964 A | 9/2011 |
| CN | 102572175 A | 7/2012 |
| JP | 2002-169671 A | 6/2002 |
| JP | P2012-048457 A | 3/2012 |

OTHER PUBLICATIONS

Anonymous; "Web Intents in Chrome The Chromium Projects ;" Mar. 8, 2013; pp. 1-17; XP055258575.

Greg Billock, James Hawkins, Paul Kinlan; "Web Intents—W3C Editor's Draft Sep. 11, 2012;" W3C Editor's Draft; Feb. 16, 2013; pp. 1-8; XP055258294.

* cited by examiner

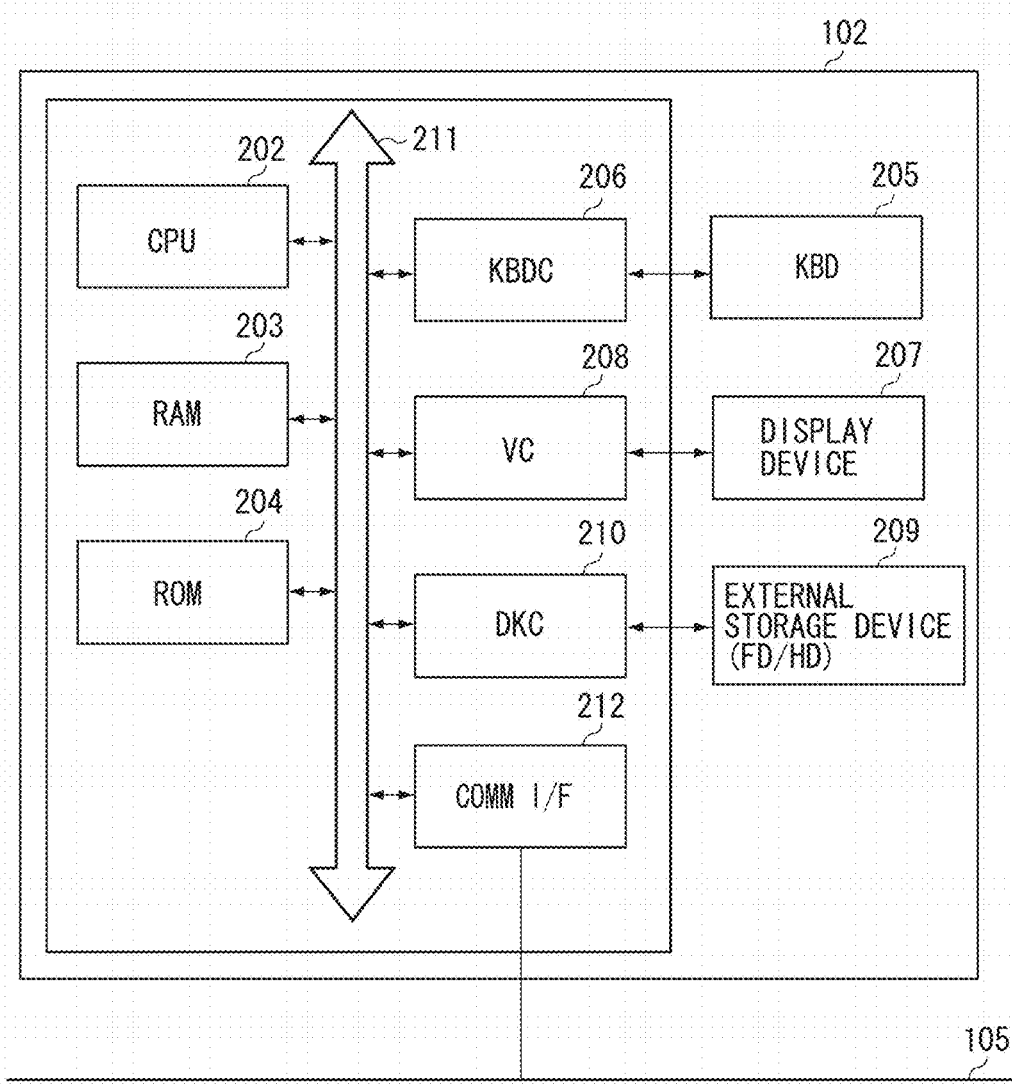

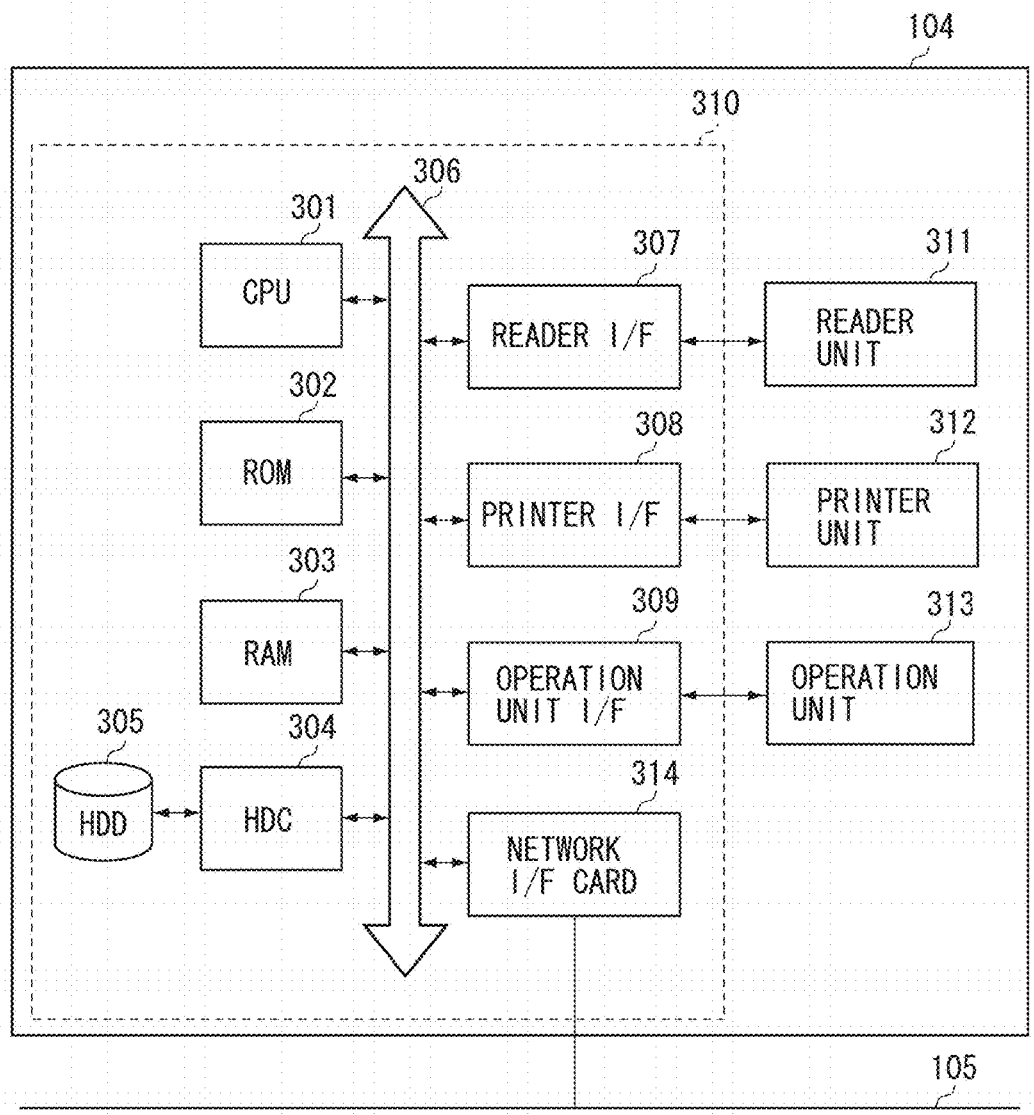

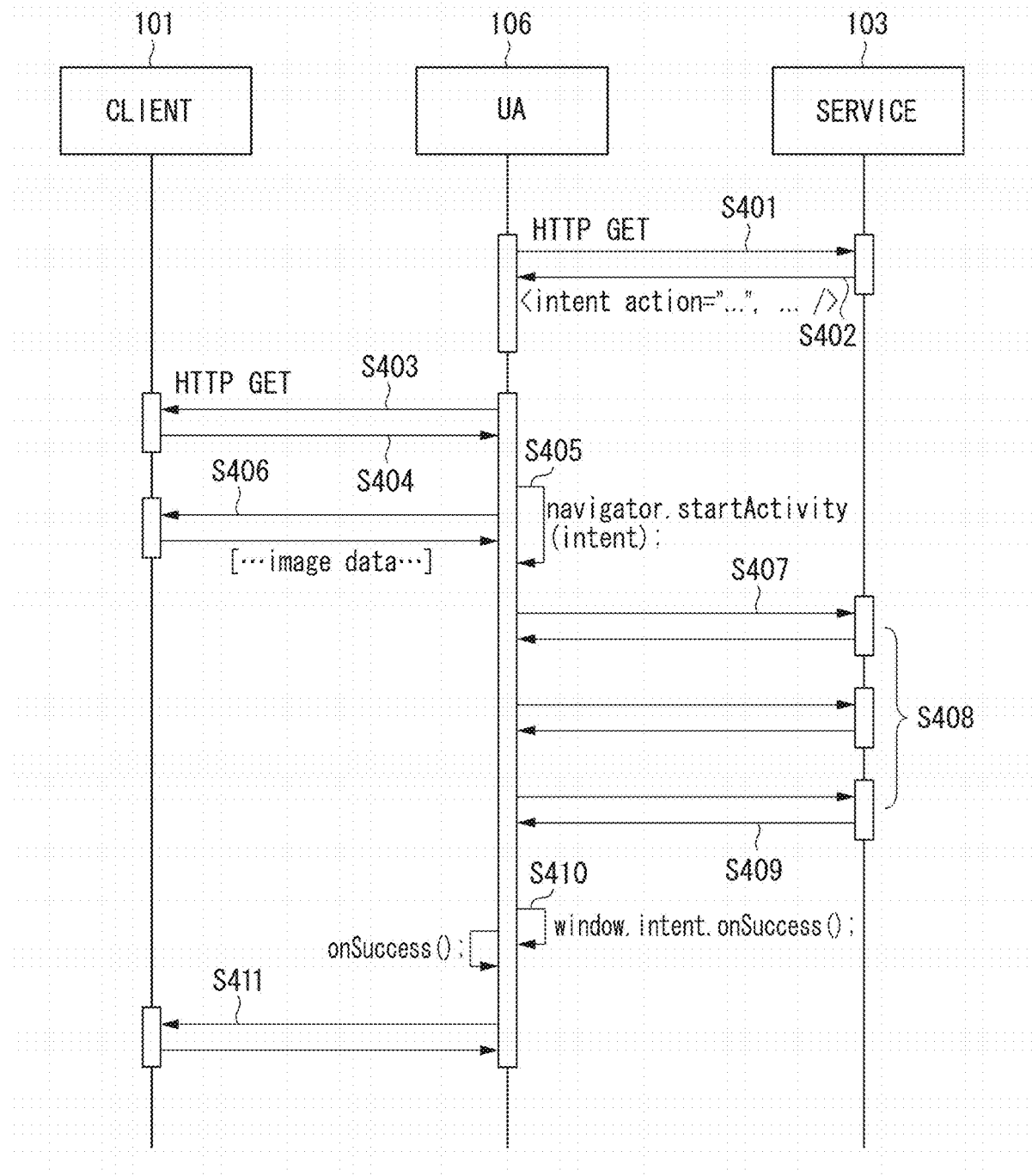

FIG. 5

```
<intent
    action="http://webintents.org/share"
    type="image/*"
    href="share.html"
    title="Share image using e-mail"
    disposition="window"
/>
```

FIG. 6

```
document.getElementById('share-photo').addEventListener(
    "click", function() {
    var intent = new Intent(
        {"action":"http://webintents.org/share",
         "type":"image/jpeg",
         "data":getImageFrom("photo.jpeg")});
    navigator.startActivity(intent, onSuccess);
}, false);
```

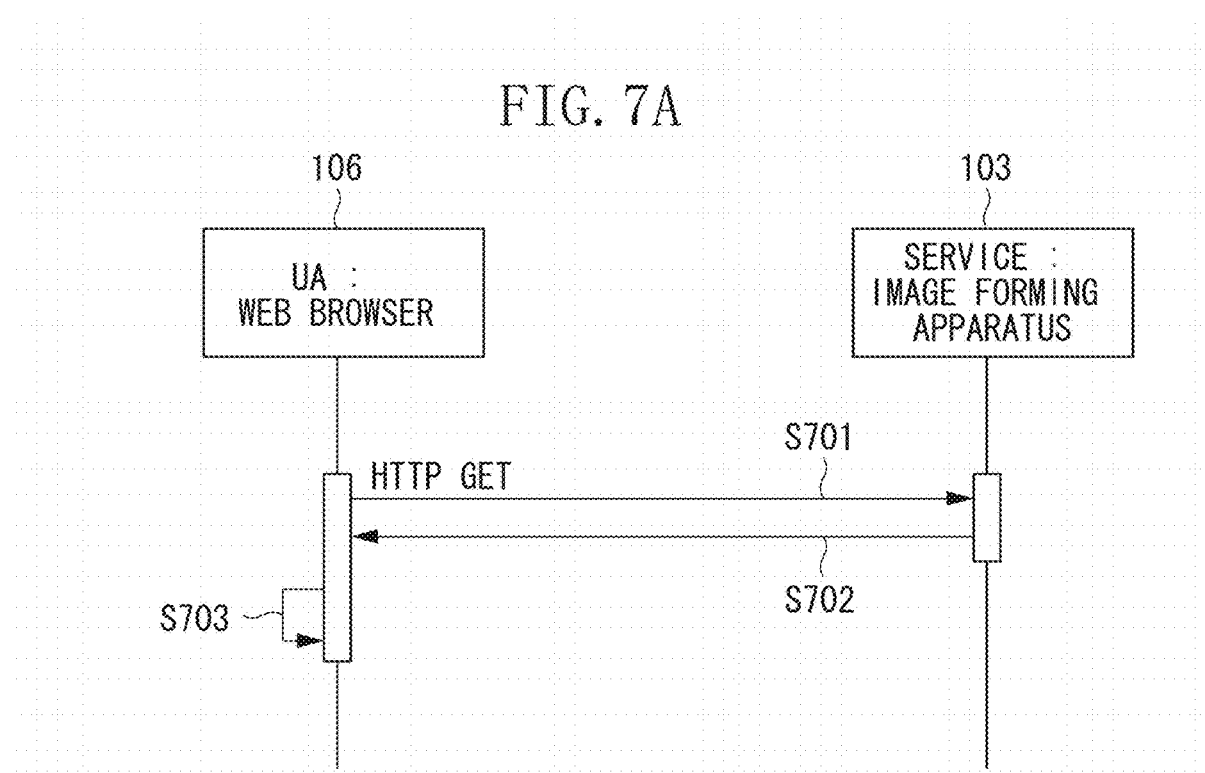

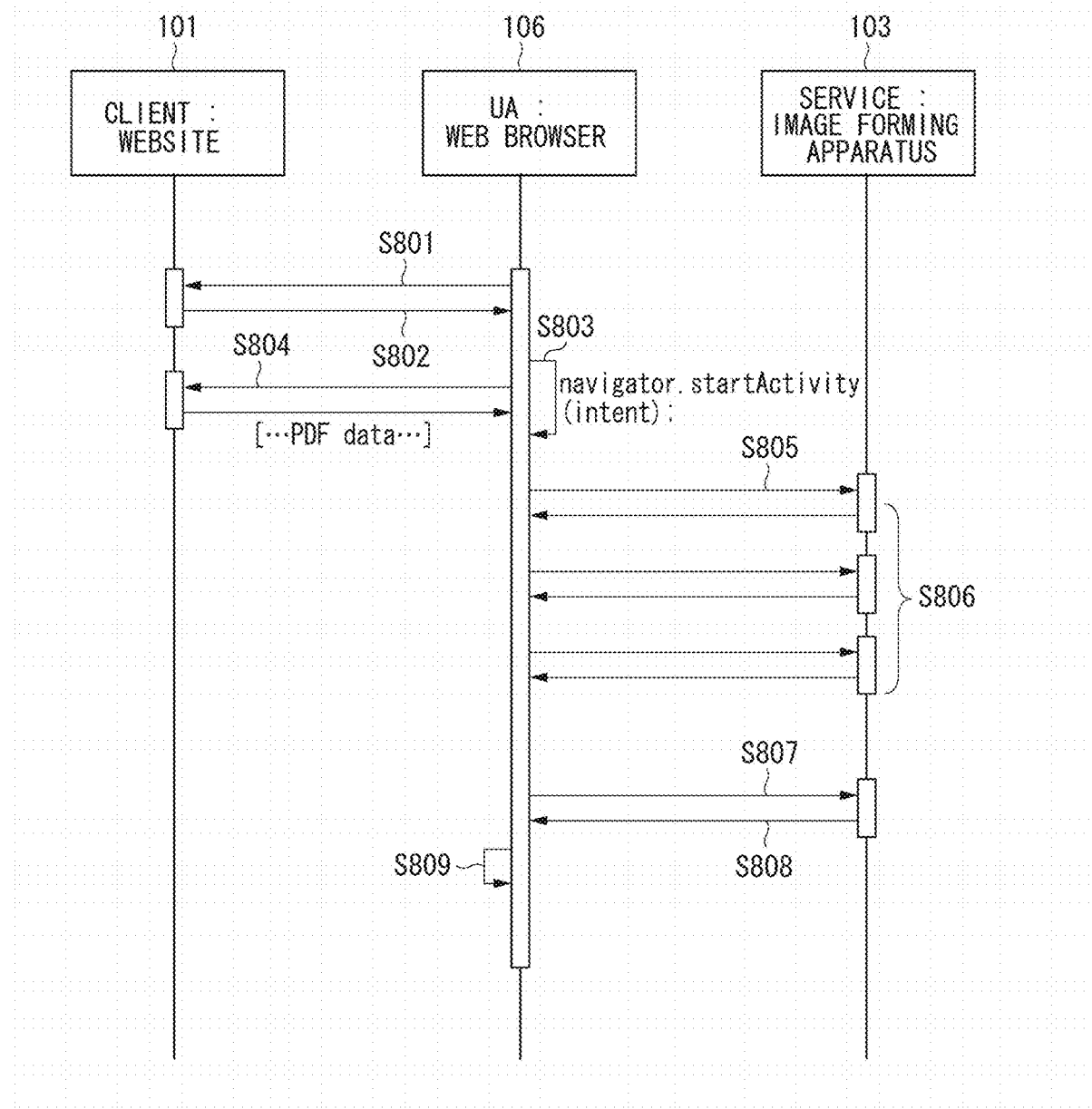

FIG. 9

```
<html>
<head>
...
<script type="text/javascript">
function getDocFrom( src )
{
// get document from the 'src'
...
}                                           } 901 function printUsingWI( src )
{
  var intent = new Intent(
     {"action":"http://webintents.org/print",
      "type":"application/pdf",
      "data":getDocFrom(src)});
     navigator.startActivity(intent);        } 902
}
</script>
...
</head>
<body>

...
<a href="/finance/2013-1q.pdf">2013-1Q Financial Report</a>
<input type="button" value="Print"
   onclick="printUsingWI('/finance/2013-1q.pdf')" />   } 903
...

</body>
</html>
```

FIG. 11A

PRINT SETTINGS
NUMBER OF COPIES: 1
PRINTING ORIENTATION: ◉ PORTRAIT [A]   ○ LANDSCAPE [A]
PAGE LAYOUT: 1 IN 1 ▼
LAYOUT ORDER: ▼
PRINTING METHOD: ONE-SIDED PRINTING ▼
COLOR MODE: AUTO (MONOCHROME/COLOR) ▼
BINDING DIRECTION: ▼
SHEET DISCHARGE METHOD: SORTING ▼
STAPLING: OFF ▼

[PRINT]

FIG. 11B

PRINT SETTINGS
NUMBER OF COPIES: 3
PRINTING ORIENTATION: ◉ PORTRAIT [A]   ○ LANDSCAPE [A]
PAGE LAYOUT: 1 IN 1 ▼
LAYOUT ORDER: ▼
PRINTING METHOD: TWO-SIDED PRINTING ▼
COLOR MODE: AUTO (MONOCHROME/COLOR) ▼
BINDING DIRECTION: BINDING ON SHORT SIDE (TOP) ▼
SHEET DISCHARGE METHOD: SORTING ▼
STAPLING: OFF ▼

[PRINT]

FIG. 12A

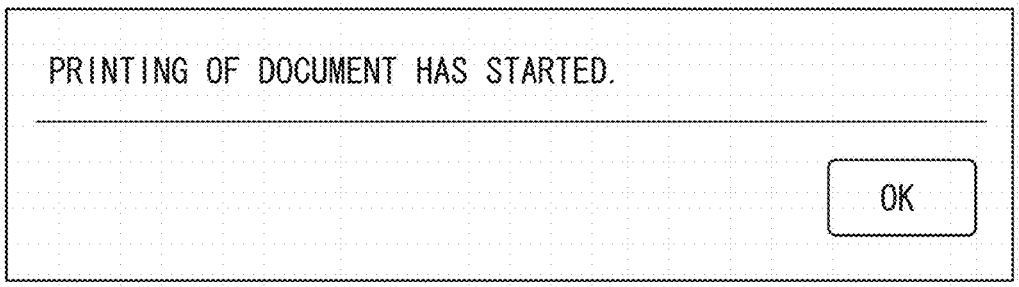

PRINTING OF DOCUMENT HAS STARTED.

```
<html>
<head>
...
<intent
action="http://webintents.org/print"
type="application/pdf"
href="print.html?dup=1&bind=su"
title="Print PDF using iR-AD C5035 on 172.24.50.35 with
Previous Settings"
disposition="window"
/>
</head>
<body>
<p>PRINTING OF DOCUMENT HAS STARTED.</p>
<hr/>
<input type="button" value="OK"
onclick="window.close();" />
</body>
</html>
```

1201 brackets lines from `<intent` through `/>`

1202 brackets lines from `<input type="button" value="OK"` through `onclick="window.close();" />`

FIG. 14

```
PRINT SETTINGS
─────────────────────────────────────────────
NUMBER OF COPIES:      [ 1 ]
PRINTING ORIENTATION:  ◉ PORTRAIT [A]   ○ LANDSCAPE [A]
PAGE LAYOUT:           [ 1 IN 1            ▼ ]
LAYOUT ORDER:          [                   ▼ ]
PRINTING METHOD:       [ TWO-SIDED PRINTING ▼ ]
COLOR MODE:            [ AUTO (MONOCHROME/COLOR) ▼ ]
BINDING DIRECTION:     [ BINDING ON SHORT SIDE (TOP) ▼ ]
SHEET DISCHARGE METHOD:[ SORTING           ▼ ]
STAPLING:              [ OFF               ▼ ]
─────────────────────────────────────────────
                                      [ PRINT ]
```

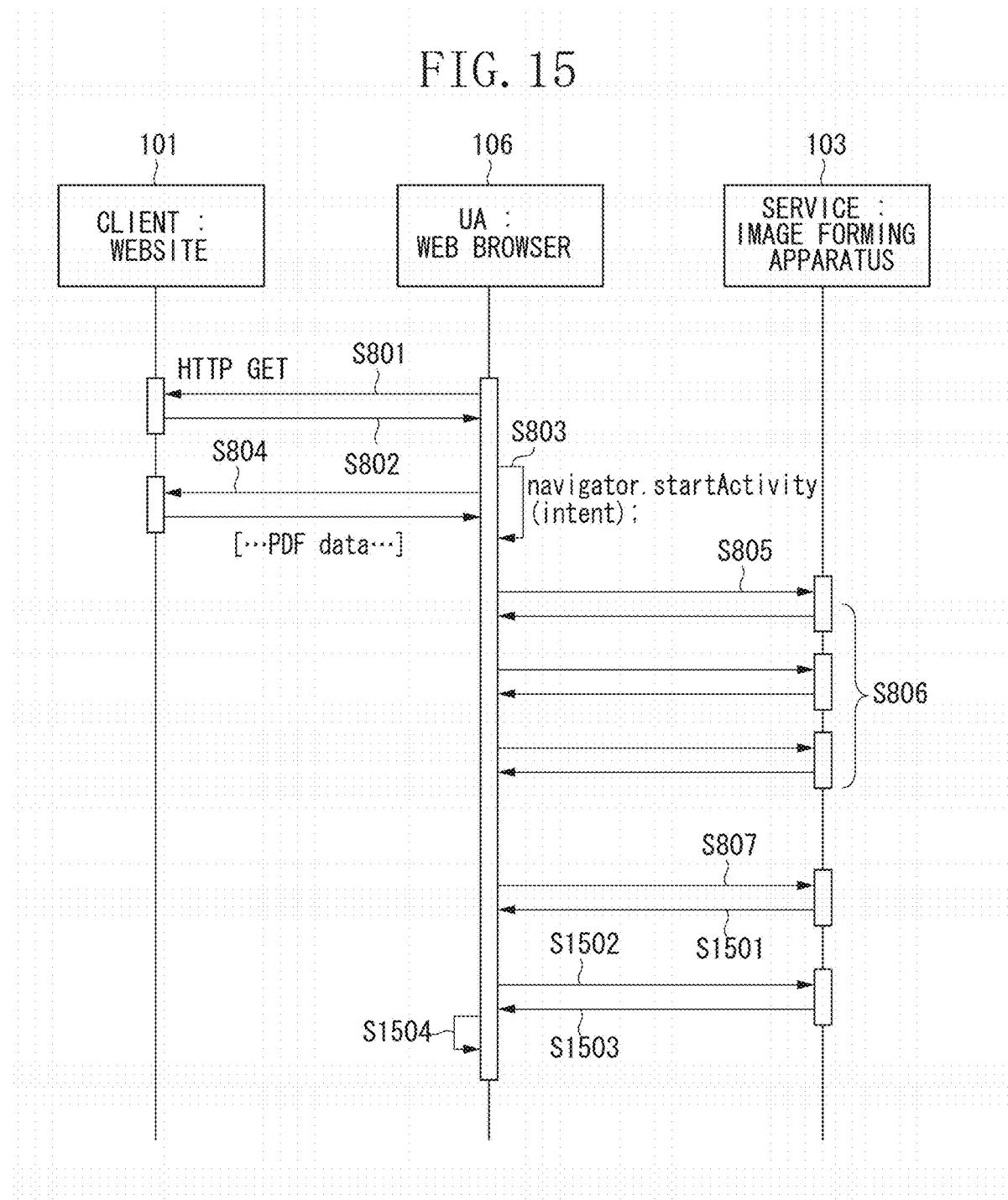

FIG. 17A

```
<intent
  action="http://webintents.org/print"
  type="application/pdf"
  href="print.html?dup=1&nup=2&dir=lr&color=c"
  title="Print PDF using iR-ADV C5035 on 172.24.50.35
  with Duplex/2-in-1/Color"
  disposition="window"
/>
```

FIG. 17B

REGISTER "Print using iR-AD C4050 on 172.24.40.50 with Duplex/2-in-1/Color".

```
PRINTING OF DOCUMENT HAS STARTED.
DO YOU WANT TO REGISTER THIS PRINTING AS WEB
INTENT OF BROWSER?

REGISTRATION NAME OF WEB INTENT:      1601
    ┌─────────────────────────────────────────────────┐
    │ Print PDF using iR-AD C4050 on 172.24.40.50 with ECO mode │
    └─────────────────────────────────────────────────┘
SELECTION OF ITEMS TO REGISTER:

☐ NUMBER OF COPIES:3

PRINTING ORIENTATION:PORTRAIT
    ☑ PAGE LAYOUT:2 IN 1
      LAYOUT ORDER:FROM LEFT TO RIGHT                    1801
    ☑ PRINTING METHOD:TWO-SIDED PRINTING
    ☑ COLOR MODE:MONOCHROME
    ☐ BINDING DIRECTION:BINDING ON SHORT SIDE (LEFT)
      SHEET DISCHARGE METHOD:SORTING
      STAPLING:OFF

1602─┤ REGISTER │   │ CLOSE │
```

FIG. 19

```
<intent
    action="http://webintents.org/print"
    type="application/pdf"
    href="print.html?dup=1&nup=2&color=m"
    title="Print PDF using iR-AD C5035 on 172.24.50.35 with ECO mode"
    disposition="window"
/>
```

FIG. 20

```
<intent
    action="http://webintents.org/print"
    type="application/pdf"
    href="print.html?dup=1&nup=2&color=m"
    title="Print PDF using iR-AD C5035 on 172.24.50.35
    with ECO mode"
    disposition="window"
    parent="print.html"
/>
```

FIG. 22

```
<intent
  action="http://webintents.org/share"
  type="image/*"
  href="mail.html"
  title="Share image by e-mail"
  disposition="window"
/>
```

FIG. 24A

E-MAIL HAS BEEN TRANSMITTED.

```
<intent
    action="http://webintents.org/share"
    type="image/*"
    href="mail.html?to=john%40mail.com&cc=molly%40mail.com"
    title="Share image by e-mail with john@mail.com and molly@mail.com"
    disposition="window"
/>
```

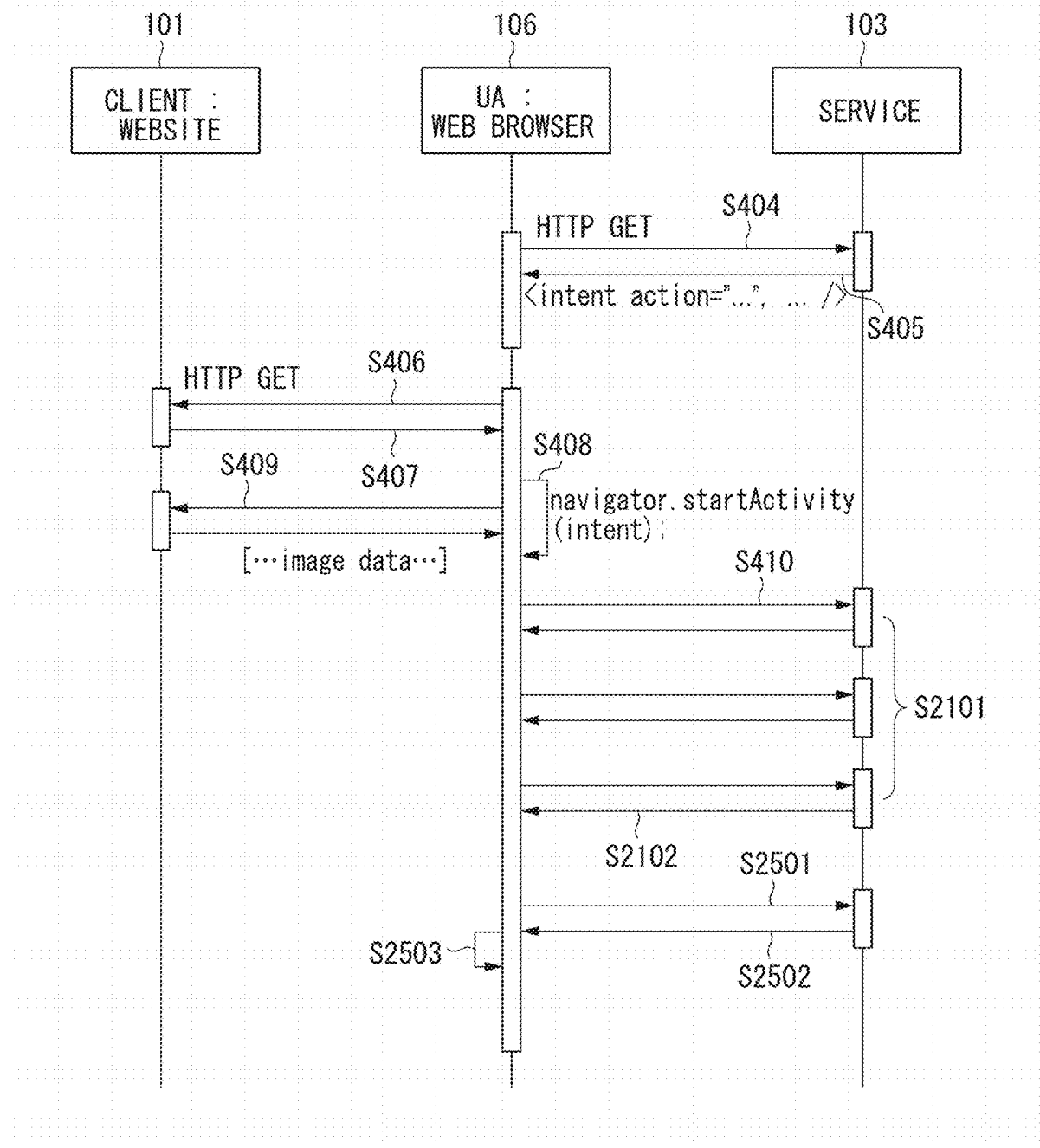

FIG. 27

```
<intent
    action="http://webintents.org/share"
    type="image/*"
    href="mail.html?to=john%40mail.com%2Cmolly%40mail.com"
    title="Share image by e-mail with John and Molly"
    disposition="window"
/>
```

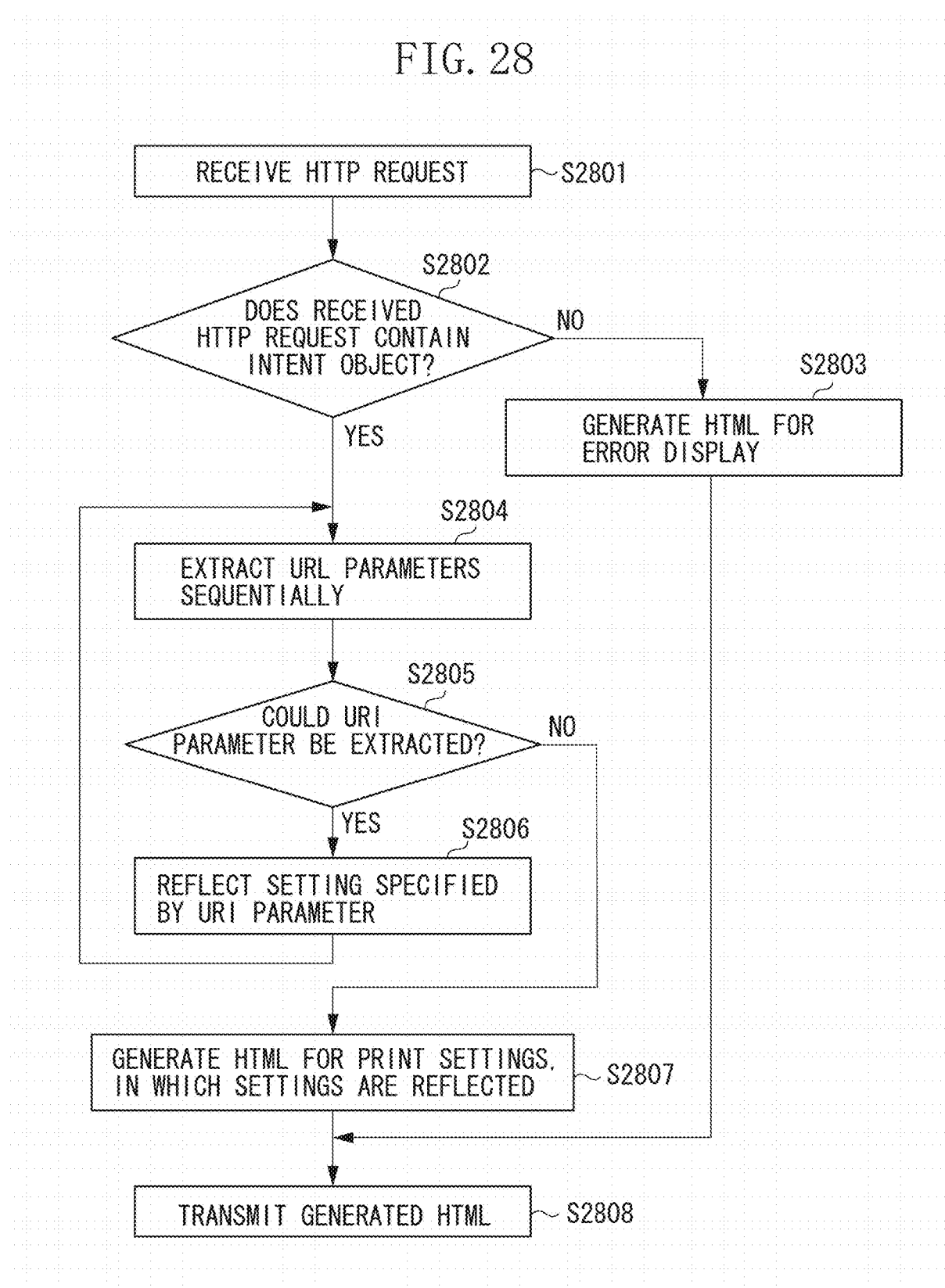

FIG. 29

| KEY | VALUE |
|---|---|
| dup《LAYOUT SETTING 1》 | 1:TWO-SIDED PRINTING, b:BINDING PRINTING, UNSPECIFIED:ONE-SIDED PRINTING |
| nup《LAYOUT SETTING 2》 | NUMERICAL VALUE: NUMBER OF PAGES PER SHEET (FOR EXAMPLE, 2 OR 4) UNSPECIFIED: ONE PAGE PER SHEET |
| color《COLOR SETTING》 | c:COLOR PRINTING, m:MONOCHROME PRINTING, a = AUTOMATIC DETERMINATION |
| bind《BINDING DIRECTION SETTING》 | COMBINATION OF (l:LONG SIDE OR s:SHORT SIDE) AND (u:TOP, d:BOTTOM, l:LEFT, OR r:RIGHT) * FOR EXAMPLE, sl (SHORT SIDE AND LEFT) |
| layout《LAYOUT ORDER OF PAGES》 | COMBINATION OF (r:FROM RIGHT OR l:FROM LEFT) AND (v:VERTICALLY OR h:HORIZONTALLY), OR UNSPECIFIED:DEFAULT * FOR EXAMPLE, rh (FROM UPPER RIGHT HORIZONTALLY) |
| out《SHEET DISCHARGE METHOD》 | s:SORTING, g:group |

FIG. 30

```
<intent
action="http://webintents.org/print"
type="application/pdf"
href="print.html?dup=1&bind=su"
title="Print PDF using iR-AD C5035 on 172.24.50.35 with Previous Settings"
disposition="window"
overwrite="true"
/>
```

INFORMATION PROCESSING TERMINAL, METHOD THEREFOR, AND STORAGE MEDIUM

BACKGROUND OF THE INVENTION

Field of the Invention

The present invention relates to a technique when a service is provided with use of a Web Intents mechanism or the like.

Description of the Related Art

Conventionally, when processing is delegated between websites, a function calling side has had to know how to call a function such as an Application Programming Interface (API) or a Representative State Transfer (REST) interface of a function provider side. Therefore, the function calling side has had to perform processing of the calling side according to each calling rule to realize cooperation with a different website. Further, authentication to the function provider side is often required to allow the function calling side to use the function. Therefore, the function user side has had to hold authentication information of the function provider side or use an authentication foundation such as Security Assertion Markup Language (SAML). However, holding the authentication information leads to the necessity of correctly and safely managing the authentication information, and use of the authentication foundation such as SAML requires establishment of an agreement in advance between the function provider and the function user. These requirements have imposed a burden on the function user.

There are also mechanisms that realize cooperation with an arbitrary web service (or a web application) without requiring using a special API. As one example thereof, there is proposed a mechanism called Web Intents that loosely couples a service receiver side and a service provider side by late runtime binding to realize cooperation there between.

As a conventional technique, Japanese Patent Application Laid-Open No. 2012-48457 discusses a technique according to which a web browser notifies a cooperation target website of information about a cooperation source website with use of a script such as a bookmarklet. The cooperation target acquires data from the cooperation source with use of the notified information.

The technique discussed in Japanese Patent Application Laid-Open No. 2012-48457 does not take a new cooperation mechanism such as Web Intents into consideration at all. If authentication information of the cooperation source website is required when the cooperation target website acquires data from the cooperation source website, the cooperation target has to know the authentication information of the cooperation source in advance, or a mechanism for sharing authentication such as SAML is required. Therefore, there is such a problem that the cooperation target cannot provide a service to an arbitrary cooperation source.

According to the new cooperation mechanism such as Web Intents, a user agent (UA) processes a Hyper Text Markup Language (HTML) document that contains a markup for registering a provided function to use the provided function offered by a service in this mechanism. The UA can request execution of the provided function by connecting to the service with use of a Web Intent corresponding to the provided function to be offered by the service, which is registered with the UA. However, even in the Web Intents mechanism, a user has to, for example, configure various kinds of settings and edit a service content via the UA when the provided function is requested. Therefore, various modifications to improve usability will be demanded from now on regarding a request to the service using this Web Intent and registration of the Web Intent.

SUMMARY OF THE INVENTION

The present invention is directed to an information processing terminal capable of improving usability for a new cooperation mechanism such as currently proposed Web Intents.

According to an aspect of the present invention, an information processing terminal, which has a relay function of relaying information/processing between a client configured to manage data and a service configured to provide a function with use of the data managed by the client, includes a registration unit configured to register function information for calling the function provided by the service with the relay function, a request unit configured to issue a request that contains the data managed by the client to the service when the function information is specified, and a specifying unit configured to specify a processing content of the function corresponding to the function information to the service. The registration unit registers function information in which at least a part of the content specified by the specifying unit is reflected with the relay function.

Further features of the present invention will become apparent from the following description of exemplary embodiments with reference to the attached drawings.

BRIEF DESCRIPTION OF THE DRAWINGS

FIG. 2 is a block diagram illustrating a hardware configuration of an information processing terminal.

FIG. 3 is a block diagram illustrating a configuration of an image forming apparatus.

FIG. 4 is a sequence diagram illustrating an overview of an operation of a Web Intents mechanism.

FIG. 5 illustrates an example of an intent tag for registering a function in the Web Intents mechanism.

FIG. 6 illustrates an example of a European Computer Manufacturers Association (ECMA) Script for launching the Web Intents mechanism.

FIGS. 7A and 7B illustrate registration processing.

FIG. 8 is a sequence diagram illustrating processing for calling a Web Intents function.

FIG. 9 illustrates an example of an HTML document (a part thereof) transmitted from a client to a UA (a web browser).

FIGS. 11A and 11B illustrate an example of a screen for configuring print settings, which is displayed by the UA (the web browser).

FIGS. 12A and 12B illustrate examples of information and a display transmitted from a service (the image forming apparatus) to the UA (the web browser).

FIG. 14 illustrates an example of a display screen for configuring the print settings, which is displayed by the UA (the web browser).

FIG. 15 is a sequence diagram illustrating processing for calling the Web Intents function according to a second exemplary embodiment.

FIGS. 17A and 17B illustrate an example of an HTML document (a part thereof) transmitted from the service (the image forming apparatus) to the UA (the web browser) according to the second exemplary embodiment.

FIG. 18 illustrates a modification of FIG. 16 according to the second exemplary embodiment.

FIG. 19 illustrates an example of an intent tag in which setting contents illustrated in FIG. 18 are reflected according to the second exemplary embodiment.

FIG. 20 illustrates an example of an intent tag with a "parent" element added thereto according to the second exemplary embodiment.

FIG. 22 illustrates an example of an HTML document (a part thereof) transmitted from the service to the UA (the web browser) according to the third exemplary embodiment.

FIGS. 24A and 24B illustrate an example of a display screen displayed by the UA 106 based on an HTML document from the service according to the third exemplary embodiment.

FIG. 25 is a sequence diagram illustrating an overview of an operation of the Web Intents mechanism according to a fourth exemplary embodiment.

FIG. 27 illustrates an example of an intent tag contained in an HTML document according to the fourth exemplary embodiment.

FIG. 28 is a flowchart illustrating processing when the service (the image forming apparatus) returns an HTML document for the settings according to a first exemplary embodiment.

FIG. 29 illustrates examples of the print settings using Uniform Resource Identifier (URI) parameters.

FIG. 30 illustrates an example of an intent tag for issuing an instruction for overwriting registration according to the first exemplary embodiment.

DESCRIPTION OF THE EMBODIMENTS

Various exemplary embodiments, features, and aspects of the invention will be described in detail below with reference to the drawings.

Figure 1A:
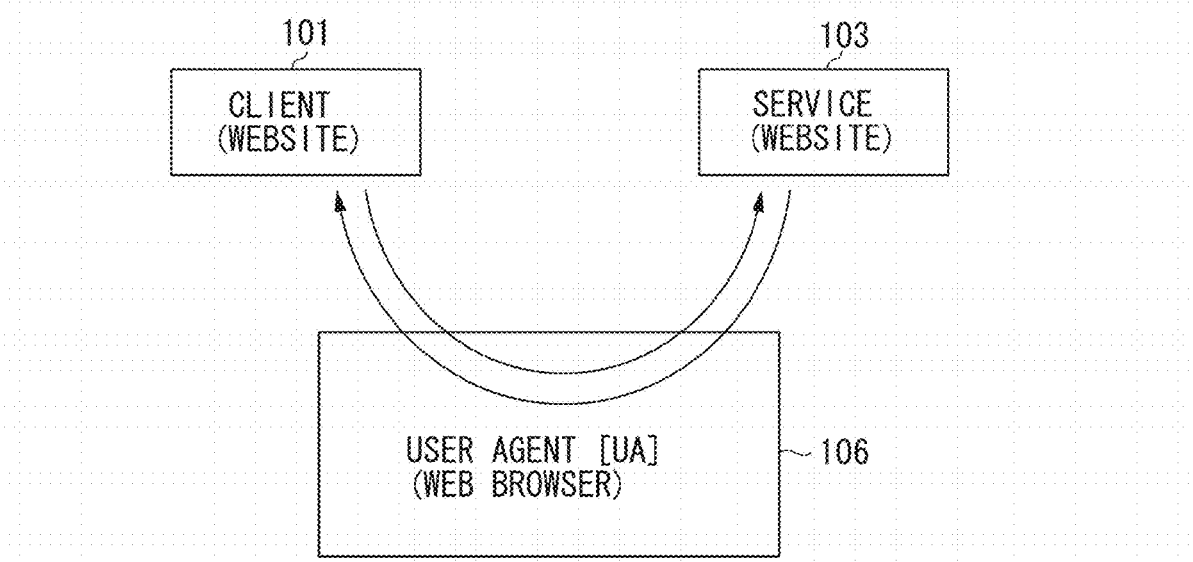
FIGS. 1A and 1B are conceptual diagrams illustrating systems according to an exemplary embodiment of the present invention.
Figure 1B:
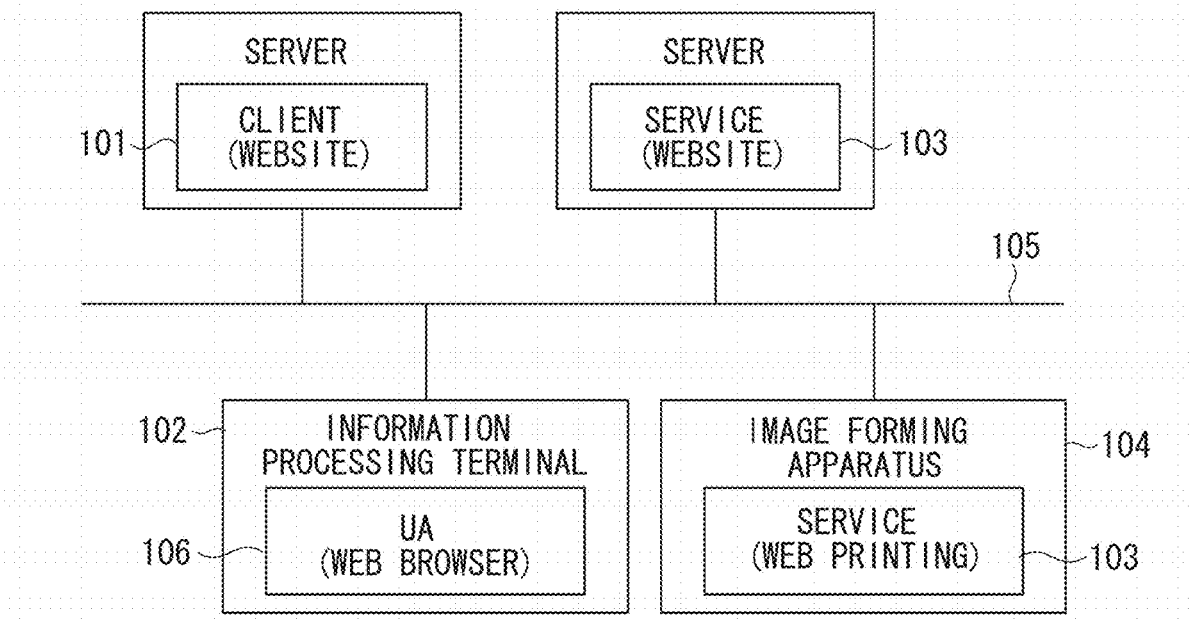

FIGS. 1A and 1B illustrate overall configurations for realizing a Web Intents mechanism, which is an example of a mechanism that allows cooperation with an arbitrary web service (or a web application) without using a special API.

A Web Intents service (hereinafter referred to as a service) 103 provides a service or a function with use of an Intents technique. A Web Intents client (hereinafter referred to as a client) 101 uses the above-described service. A user agent (UA) 106 plays a role of transferring a request from the client 101 to the service 103 and transferring a result from the service 103 to the client 101. The UA 106 can be considered as a relay function for carrying out a request and transferring data between the client 101 and the service 103.

Further, a Web Intent, which is function information for calling a provided function of the service 103, is registered in the UA 106.

In the present mechanism, for example, the client 101 is a website that manages data and has a button for calling the service 103 and the like disposed thereon, and the UA 106 is a web browser that displays this website. Further, the service 103 is a website serving as a cooperation destination of the client 101, which receives the data managed by the client 101 via the UA 106 and processes it. For example, if this mechanism is applied to a social networking service (SNS), the service 103 corresponds to a posting destination service that receives posting of a photograph and a comment managed by the client 101 to constitute a site where they are viewed. If user authentication or an operation by a user is required when the service 103 provides the function, the user carries out the operation on the UA 106.

The UA 106 can be realized not only by the browser but also by an operating system (OS), an arbitrary application, and the like that operate on an information processing terminal, as long as it has a function for cooperating with a service that will be described below. Examples of the information processing terminal include a personal computer, a smartphone, a tablet, and a car navigation system.

Further, as the Web Intents service 103, for example, a device such as a camera installed in the information processing terminal, an image forming apparatus, and a scanner can be also a service provider, besides a service provider in the Internet, like the above-described posting destination service. Further, as the service 103, a web service provided by a peripheral device such as an image forming apparatus, a scanner, and a network camera, a home appliance such as a refrigerator and a television, and the like connected with a network can be also a service provider.

Among the client 101, the UA 106, and the service 103, an arbitrary combination thereof may work in a same system. More specifically, one possible example thereof is such a case that a document edition application or the like having a function equivalent to a web browser operates as a configuration including the client 101 and the UA 106.

FIG. 4 is a sequence diagram illustrating a basic operation regarding provision of the service with use of the Web Intents mechanism.

In step S401, the UA 106 accesses the service 103 in response to a user's operation. In step S402, the service 103 returns an HTML response that contains a registration markup for registering the function provided by the service 103 in the UA 106, to the UA 106.

The content of the HTML document returned from the service 103 to the UA 106 will be described with reference to an example illustrated in FIG. 5. Information for identifying the provided function is described in an <intent> tag. In this tag, "action" indicates a category of the provided function, and "type" indicates a type of data and the like that the provided function can handle. Further, "href" indicates a connection destination (Uniform Resource Locator (URL)) of the provided function, and "title" indicates a title of the provided function. Further, "disposition" indicates how the called provided function is displayed.

In the example illustrated in FIG. 5, the category of the provided function is "share". The type of the data and the like that the provided function can handle is "image data in any format (*)". The connection destination is "share.html". The title is "Share image using e-mail". Further, FIG. 5 illustrates that this function is displayed in another window via the UA 106.

Upon receiving the reply in step S402, the UA 106 confirms to the user whether to register the provided function of the service 103 in the UA 106. For example, if the UA 106 is a web browser, the UA 106 displays a pop-up window, and prompts the user to select whether to register the function. If the user selects registration of this provided function as a Web Intent, the UA 106 stores the information received in step S402 therein. More specifically, the provided function is stored in a storage area of the information processing terminal on which the UA 106 operates, and is registered with the UA 106 as a Web Intent.

In step S403, the UA 106 accesses the client 101 in response to the user's operation. In step S404, the client 101 returns an HTML document in which use of the provided function (the Web Intent) of the service 103 is described, to the UA 106. For example, if an image and a "share" button are supposed to be displayed on the website as the client 101, this website returns an HTML document that contains an ECMA Script illustrated in FIG. 6, to the UA 106.

The content of the HTML document returned from the client 101 to the UA 106 will be described with reference to an example illustrated in FIG. 6. The ECMA Script indicates that clicking a button having an identification (ID) "share-photo" in the HTML triggers execution of a specified unnamed function. First, the unnamed function generates a new Intent object, and calls a startActivity( ) function using this object as an argument. When this function is executed, the UA 106 extracts Web Intents each having an action and a type that match those of the specified Intent object among Web Intents registered with the UA 106 to display them as a list, thereby requesting the user to select one of them. Further, the UA 106 acquires image data held by the client 101 by executing a getImageFrom( ) function called in the unnamed function.

In step S404, the UA 106 receives the HTML document from the client 101, and displays the screen. In step S405, upon detecting that the "share" button on the display screen is pressed by the user, the UA 106 executes the ECMA Script for launching the Web Intents mechanism as described above. Then, in step S406, the UA 106 acquires the image data held by the client 101. Further, when detecting that the "share" button is pressed in step S405, the UA 106 displays a list of the Web Intents registered with the UA 106. Upon detecting the user's selection of the Web Intent indicating the provided function of the service 103 from the displayed list, in step S407, the UA 106 transmits a Hyper Text Transfer Protocol (HTTP) request to the selected service 103. At this time, the UA 106 adds the content of the Intent object generated in the ECMA Script illustrated in FIG. 6 to the transmission data.

In step S408, the service 103 extracts the Intent object from the HTTP request, and realizes use of the selected provided function ("share" of the image data of the client 101 in this example) while interacting with the user via the UA 106.

Upon completion of the processing, in step S409, the service 103 returns a reply that contains an ECMA script notifying the client 101 of a processing result. In step S410, the UA 106 executes the ECMA Script contained in the reply, and calls a callback function on Success( ) specified as an argument in the startActivity( ) function executed in step S405. In step S411, the UA 106 returns the processing result to the client 101 by the callback function onSuccess( ).

An example of using a web-based electronic mail function will be described according to the sequence illustrated in FIG. 4. First, when a user visits a site including a button for calling Web Intents of a web storage (the client 101) managing photograph data on a web browser (the UA 106), and presses the button, the web browser (the UA 106) displays a pop-up window that includes a list of registered services. If the user selects the web-based electronic mail function in this window, a site that provides this function is displayed in another window, and a new electronic mail to which photograph data is attached is generated in this window as a processing result.

This processing allows the client 101 to call the Web Intents function ("share" of an image in this example) provided by the service 103 via the UA 106.

FIG. 1B illustrates an example of a configuration of a network system that employs the Web Intent mechanism according to a first exemplary embodiment of the present invention.

Referring to FIG. 1B, a web browser functioning as the user agent (UA) 106 in the Web Intents mechanism operates on an information processing terminal 102. Further, in a network, there are an image forming apparatus 104 capable of functioning as the service 103 in the Web Intents mechanism, and servers that provide websites. Examples of the image forming apparatus 104 include a digital multifunction peripheral having a printing function and a scanning function, a printer, a scanner, and a digital camera. Further, the image forming apparatus 104 also operates as a web server. The information processing terminal 102 and the image forming apparatus 104 are communicable to each other via the network 105. Further, the network 105 may be a local area network (LAN), the Internet, a combination thereof, or the like. The network 105 may have any connection configuration regardless of wired connection or wireless connection.

The UA 106 realized by the web browser or the like has functions of a registration unit that performs processing regarding Intent registration, a management unit that manages registered Intents, and a display control unit that provides a screen for receiving an instruction for registration, execution, or the like of an Intent from a user. Further, the UA 106 relays data, a processing result, and the like between the client 101 and the service 103 according to a predetermined protocol such as HTTP.

More specifically, the UA 106 registers an Intent via a user's operation by accessing the service 103 such as the image forming apparatus 104. Further, the UA 106 receives a request for execution of a Web Intent service by accessing the website that is the client 101, and is connected to the service 103 such as the image forming apparatus 104 according to a user's selection with use of the registered information. Further, the UA 106 receives a notification that indicates completion of processing of the Web Intent from the service 103, and notifies the client 101 of the processing result.

The image forming apparatus 104 provides a web printing function of realizing print settings and print processing for document data requested from the client 101 with use of a graphical user interface (GUI) of the web browser functioning as the UA 106. In exemplary embodiments that will be described below, the category of this function is specified by specifying "print (printing)" in "action" of an Intent. This is a hypothetical definition for simply explaining the exemplary embodiments, and the present invention can be employed even if an arbitrary category such as "share" or "view" is specified in "action" when the category is specified for the printing function provided by the image forming apparatus 104.

FIG. 2 is a block diagram illustrating a hardware configuration of the information processing terminal 102 in which a program (a web browser, an OS, or the like) functioning as the UA 106 is executed. Further, the server in which a program (a website or the like) functioning as the client 101 or the service 103 operates can have a similar hardware configuration.

Referring to FIG. 2, the information processing terminal 102 includes a central processing unit (CPU) 202, a random access memory (RAM) 203, a read only memory (ROM) 204, and an external storage device 209. The CPU 202 executes a program stored in the ROM 204 or the external storage device 209, or a program downloaded from the network 105 such as the LAN, and comprehensively controls respective devices connected to a system bus 211. The RAM 203 functions as, for example, a main memory or a work area of the CPU 202. The external storage device 209 is embodied by a hard disk (HD), a floppy (registered trademark) disk (FD), or the like. The external storage device 209 stores various kinds of applications including a boot program, an operating system, an authentication server, and an authentication client, database data, a user file, and the like. Further, the information processing terminal 102 includes a keyboard controller (KBDC) 206 that transmits information input from a keyboard (KBD) 205 and a pointing device (not-illustrated) to the CPU 202. A video controller (VC) 208 controls a display of a display device 207 embodied by a cathode-ray tube (CRT), a liquid crystal display (LCD), or the like. A disk controller (DKC) 210 controls access to the external storage device 209. A communication controller (COMM I/F) 212 mediates connection to the network 105.

FIG. 3 is a block diagram illustrating a configuration of the image forming apparatus 104. A CPU 301 executes software stored in a ROM 302 or a hard disk (HD) 305 for controlling the whole image forming apparatus 104, and comprehensively controls respective devices connected to a system bus 306. The RAM 303 functions as, for example, a work area of the CPU 301. A hard disk controller (HDC) 304 controls the HD 305. A reader interface (I/F) 307 and a printer I/F 308 are connected to a reader unit 311 and a printer unit 312, respectively, and control these devices. An operation unit I/F 309 is connected to an operation unit 313, and controls a display on the operation unit 313 and a user input from the operation unit 313. The operation unit 313 includes a switch, a display unit, and the like for an operation. A network interface card (NIC) 314 exchanges data with an external apparatus via the network 105. In the following description, a portion surrounded by a broken line in FIG. 3 will be referred to as an overall control unit 310. The overall control unit 310 is a unit that controls the various kinds of devices connected to the image forming apparatus 104 and the interfaces, and controls an operation of the whole image forming apparatus 104. The reader unit 311 reads out an image on a document, and outputs image data according to the document image to the printer unit 312 or stores it into the storage device, such as the HD 305, in the image forming apparatus 104 according to a user's instruction. Further, the reader unit 311 can also transmit the image data to an external apparatus connected to the network 105 via the network I/F card 314. The printer unit 312 prints the document read by the reader unit 311 or image data stored in the storage device in the main body of the image forming apparatus 104. Further, the printer unit 312 receives a print job from an external apparatus connected to the network 105 via the network I/F card 314, and prints it. The operation unit 313 displays information from the overall control unit 310 to a user, and notifies the overall control unit 310 of the user's input with use of a button and a display device, a liquid crystal display screen equipped with a touch panel input function, or a combination thereof.

Further, the overall control unit 310 mutually communicates with another information apparatus in the network 105 via the network I/F card 314, and provides and controls a web service such as the web printing function. The image forming apparatus 104 can be also designed to use another CPU or the like within the image forming apparatus 104 as a hardware configuration that provides the web service.

FIGS. 7A and 7B illustrate Intent registration processing in the Web Intents mechanism.

FIG. 7A illustrates a sequence until registration of an Intent corresponding to the service 103 provided by the image forming apparatus 104 in the UA 106.

In step S701, the UA 106 transmits an HTTP request to the website of the web printing function of the image forming apparatus 104 in response to a user's operation. In step S702, the service 103 of the image forming apparatus 104 returns an HTML document that contains a markup (an intent tag) for Web Intent registration to the UA 106 in response to this HTTP request.

FIG. 7B illustrates an example of the intent tag for Web Intent registration contained in the reply.

In the intent tag, "print (printing)" is specified as the category of the provided function, and ".pdf (Portable Document Format)" is specified as a processable data type (data format). Further, "href" in the intent tag indicates that a start of this provided function will be triggered by transmission of an HTTP request to a page "print.html" in the image forming apparatus 104.

In step S703, upon receiving the HTML document that contains this markup for registration, the UA 106 displays a dialog for confirming to the user whether to register this Intent if a same Intent is not registered within the UA 106 yet. Upon detecting an instruction for registration from the user via the dialog, the UA 106 registers the information contained in the markup for registration within the UA 106.

FIG. 8 illustrates a sequence until calling for the Web Intents function by the client 101 is processed by the service 103 via the UA 106. The present sequence will be described with use of the image forming apparatus 104 as the service 103, as a specific example.

In step S801, the UA 106 transmits an HTTP request to the client 101 according to a user's instruction. In step S802, the client 101 returns an HTML document in response to the HTTP request from the UA 106.

FIG. 9 illustrates an example of a part of the HTML document returned from the client 101 to the UA 106 in step S802.

An ECMA Script function 901 is a function for acquiring document data from a specified address (the internal processing of the function will not be described here). A function 902 is a function for instructing the UA 106 to call an Intent of the "print" category to print the document data acquired by a getDocFrom( ) function as the function 901. An HTML element 903 is an element for displaying a link to the document, and a button for launching a printUsingWI( ) function as the function 902 to print the document with use of the Web Intents mechanism, on the UA 106.

In step S803, upon detecting that the button corresponding to the HTML element 903 is pressed by the user via a display screen, the UA 106 executes the printUsingWI( ) function 902. This function calls the getDocFrom( ) function. In step S804, the UA 106 acquires the specified document data from the website that is the client 101 according to the execution of the function in step S803.

Next, the UA 106 generates an Intent object in the printUsingWI ( ) function with use of the acquired document data, and calls a navigator.startActivity( ) function with use of this object as an argument. By calling this function, the UA 106 displays a list of registered Intents that can process the generated Intent object to allow the user to select appropriate processing. At this time, the UA 106 displays the list according to the specified contents of the action and the type.

Figure 10:
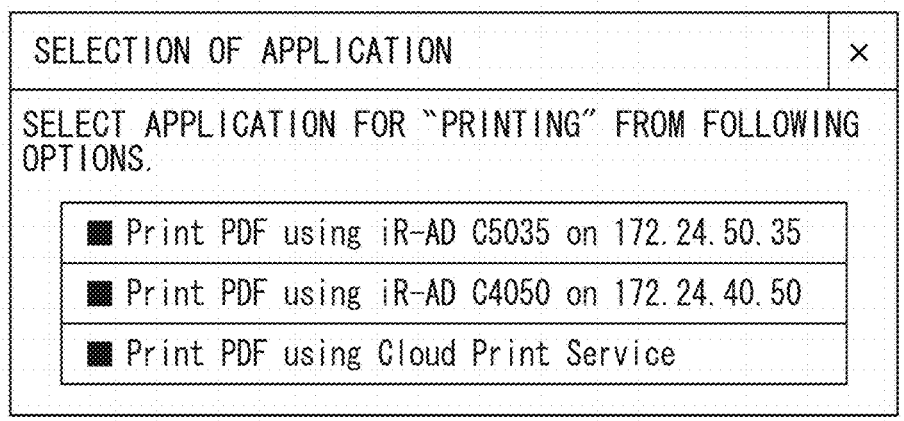
FIG. 10 illustrates an example of a screen for selecting a Web Intent, which is displayed by the UA (the web browser).

FIG. 10 illustrates an example of a screen for selecting an Intent capable of processing the Intent object, displayed by the UA 106 by executing the function in step S803. FIG. 10 illustrates an example in which the values of the titles of the registered Intents are displayed in the list, but the Intents may be displayed with use of another value as identification information. Each user selects a desired printing method from them. In this example, it is supposed that the user selects "Print PDF using iR-AD C5035 on 172.24.50.35" registered in step S803.

In step S805, the UA 106 transmits an HTTP request that contains the Intent object provided as the argument of the startActivity( ) function to the image forming apparatus 104 as the service 103, in response to the user's selection of the Web Intent via the selection screen illustrated in FIG. 10.

In step S806, upon receiving the HTTP request that contains the Intent object, the image forming apparatus 104 returns an HTML document for displaying a screen for configuring print settings to the UA 106. After that, in step S806, the UA 106 configures the print settings for the document data contained in the Intent object according to the user's operation while communicating with the image forming apparatus 104.

FIG. 28 is a flowchart illustrating processing performed in step S806 by the image forming apparatus 104 as the service 103, which is triggered by the reception of the HTTP request in step S805. The CPU 301 of the image forming apparatus 104 reads a control program specific to the present exemplary embodiment, which is stored in a non-volatile storage unit such as the ROM 302 or the HD 305, to execute it, and this realizes processes of respective steps in the flowchart.

In step S2801, the image forming apparatus 104 receives the HTTP request from the UA 106. In step S2802, the image forming apparatus 104 determines whether the received HTTP request contains an Intent object. As a result of the determination, if the received HTTP request contains an Intent object (YES in step S2802), the processing proceeds to step S2804. If the received HTTP request does not contain an Intent object (NO in step S2802), the processing proceeds to step S2803.

In step S2803, the image forming apparatus 104 generates an HTML document for error display, for displaying that this request is an invalid request on the UA 106. Subsequently, in step S2808, the image forming apparatus 104 transmits the generated HTML document for error display to the UA 106.

In step S2804, the image forming apparatus 104 extracts URI parameters in the HTTP request sequentially. The URI parameters are a group of character strings in the form of "key=value". In step S2805, the image forming apparatus 104 determines whether a URI parameter could be extracted in step S2804. If a URI parameter could not be extracted, i.e., extraction of all URI parameters has been completed (NO in step S2805), the processing proceeds to step S2807. On the other hand, if a URI parameter could be extracted (YES in step S2805), in step S2806, the image forming apparatus 104 reflects a print setting according to the content of the extracted URI parameter. After that, the processing returns to step S2804, and the image forming apparatus 104 extracts a next URI parameter.

In step S2807, the image forming apparatus 104 generates an HTML document for the print settings, in which the contents of the URI parameters are reflected. After that, in step S2808, the image forming apparatus 104 transmits the generated HTML document to the UA 106.

FIG. 29 illustrates examples of the URI parameters specified as the print settings. These examples include a layout setting 1 (dup), a layout setting 2 (nup), a color setting (color), a binding direction setting (bind), a layout order of pages (layout), a sheet discharge method (out), and the like as the parameters. For example, a URI parameter "dup=1" indicates a setting of two-sided printing. A URI parameter "nup=4" indicates printing four pages contained in the document data on a single surface of a single sheet. Other parameters are also expressed by any of the contents illustrated in FIG. 29.

FIG. 11A illustrates an example of a setting screen displayed by the UA 106 (the web browser) based on the HTML document for the print settings, which is transmitted from the image forming apparatus 104 to the UA 106 in step S806 illustrated in FIG. 8. The user configures the print settings as desired by operating the setting screen illustrated in FIG. 11A, and clicks a "PRINT" button on the setting screen, thereby issuing an instruction to print the document data as the Intent object.

The Intent "Print PDF using iR-AD C5035 on 172.24.50.35", which is the Intent selected by the user, corresponds to the service that prints the document data desired by the user and configures the settings at the time of the printing. FIG. 11B illustrates an example of the setting screen when the user has completed changing the settings.

Now, returning to the description of FIG. 8, upon detecting that the "PRINT" button is clicked by the user on the screen illustrated in FIG. 11B, in step S807, the UA 106 transmits an HTTP request indicating that the "PRINT" button is clicked to the image forming apparatus 104 together with the setting contents illustrated in FIG. 11B. Upon receiving this HTTP request, the image forming apparatus 104 starts printing the document data (pdf) received in step S805 according to the print settings specified in the HTTP request. In step S808, the image forming apparatus 104 transmits an HTML document to the UA 106 as a reply to the request transmitted in step S807.

FIG. 12A illustrates an example of a display by the UA 106 (the web browser) based on the HTML document transmitted from the image forming apparatus 104 in step S808. FIG. 12B illustrates an example of the HTML document transmitted from the image forming apparatus 104 to the UA 106 in step S808.

Referring to FIG. 12B, a description content 1202 is an HTML element for displaying the screen illustrated in FIG. 12A. Upon detecting that an "OK" button is clicked on the screen illustrated in FIG. 12A, the UA 106 closes a window of the UA 106 that displays this screen.

A description content 1201 is an intent tag for additionally registering a Web Intent for performing printing according to the setting contents contained in the HTTP request transmitted in step S807 with the UA 106. An "href" element in the tag has a content in which the setting contents selected by the user on the screen illustrated in FIG. 11B are reflected. The URI parameters "dup=1" and "bind=su" contained in the description content 1201 indicate two-sided printing, and binding sheets at the top (u) on the short side (s), respectively. Further, the URI parameters in the "href" element in the description content 1201 do not include a setting about the number of copies, and setting values that are not changed by the user on the screen illustrated in FIGS. 11A and 11B (default setting values illustrated in FIG. 11A).

The setting items that should be described in the description content 1201 (the items illustrated in FIGS. 11A and 11B, and FIG. 29) can be arbitrarily edited by a provider that provides the service such as the image forming apparatus 104. Further, the present exemplary embodiment can be also designed in such a manner that the number of copies and the default values are also contained in the description content 1201 for the purpose of, for example, causing the user to confirm them by the display function of the UA 106.

In step S809, upon receiving the HTML document illustrated in FIG. 12B, the UA 106 displays a screen for confirming to the user whether to register the content of this intent tag with the UA 106 as a Web Intent if the content of the intent tag in the description content 1201 is not registered yet. If detecting that registration of the Web Intent is selected by the user, the UA 106 additionally registers this Web Intent within the UA 106.

Figure 13:
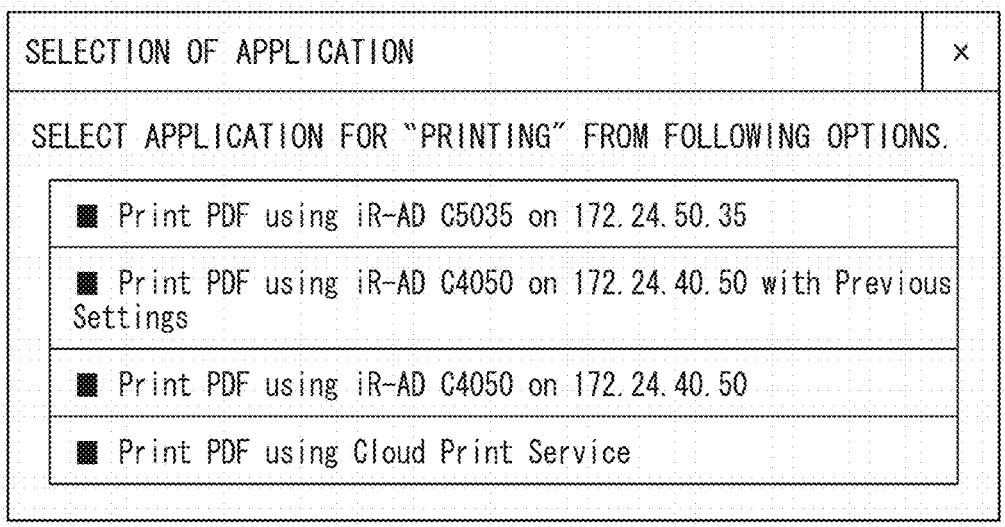
FIG. 13 illustrates an example of a screen for selecting a Web Intent, which is displayed by the UA (the web browser).

FIG. 13 illustrates an example of a screen for selecting one of Web Intents, which is displayed by the UA 106 after the Intent is registered according to the reception of the HTML document illustrated in FIG. 12B. The screen illustrated in FIG. 13 additionally includes an option "Print PDF using iR-AD C5035 on 172.24.50.35 with Previous Settings" registered in step S809, compared to the selection screen illustrated in FIG. 10.

Upon receiving an HTML request according to the user's selection of this newly added Web Intent from the UA 106, the image forming apparatus 104, which is the service 103, performs the processing exemplified in FIG. 28, recognizes the print setting information, generates a reply based on an HTML document in which the setting contents are reflected, and transmits the generated reply to the UA 106. The setting contents contained in the description content 1201 illustrated in FIG. 12B are reflected in the HTML document generated at this time.

FIG. 14 illustrates an example of a screen that the UA 106 displays based on the HTML document transmitted from the image forming apparatus 104 when the option "Print PDF using iR-AD C5035 on 172.24.50.35 with Previous Settings" is selected. The setting contents (the setting of two-sided printing and the setting of binding sheets at the top on the short side) described in the "href" element in the description content 1201 are reflected on this setting screen. Further, "1" is selected as the setting about the number of copies, as seen from a comparison with the settings illustrated in FIG. 11B.

If additional registration of the Intent according to the above-described process of step S809 is repeated, this results in registration of a plurality of Web Intents having the same title with the UA 106 (the web browser).

FIG. 30 illustrates an example of an intent tag generated by adding information indicating that a registered Web Intent should be overwritten to the intent tag in the HTML document illustrated in FIG. 12B. When the UA 106 detects an intent tag in which an "overwrite" element is set to "true" in an HTML document, if a Web Intent having a same "title" as the website of the service 103 is already registered, the UA 106 registers the Intent while overwriting the previous one based on the content contained in the "href" element. Alternatively, even without preparing the "overwrite" element, if a Web Intent having a same "title" as the website of the service 103 is already registered with the UA 106, the UA 106 may register the Intent while overwriting the previous one.

Further, regarding overwriting registration, the present exemplary embodiment can be also designed in such a manner that the UA 106 presents a confirmation screen to the user to confirm whether to overwrite the Intent.

A second exemplary embodiment is an exemplary embodiment in which the service 103 returns an HTML document to confirm whether to transmit the HTML document that contains the intent tag to the UA 106, instead of returning the HTML document (FIG. 12B) that contains the intent tag in step S808 illustrated in FIG. 8 according to the first exemplary embodiment.

In the following description of the processing according to the second exemplary embodiment, because this processing is substantially similar to the above-described first exemplary embodiment, only a difference therefrom will be described below. More specifically, the processing from the registration of the Web Intent of the image forming apparatus 104 with the UA 106 to the execution of the Web Intent by the UA 106 in response to calling of the Web Intents function by the client 101 is similar to the first exemplary embodiment, whereby the description thereof will be omitted below.

FIG. 15 illustrates a sequence until calling of the Web Intents function by the client 101 is processed by the service 103 via the UA 106. The present sequence will be described with use of the image forming apparatus 104 as the service 103, as a specific example. Further, in FIG. 15, the processes until step S807 are similar to those illustrated in FIG. 8 according to the first exemplary embodiment, whereby only processes after that will be described.

In step S1501, the image forming apparatus 104 transmits an HTML document to the UA 106 as a reply to the request transmitted in step S807. The content thereof is a content indicating that printing according to the execution of the Web Intent has started.

Figure 16:
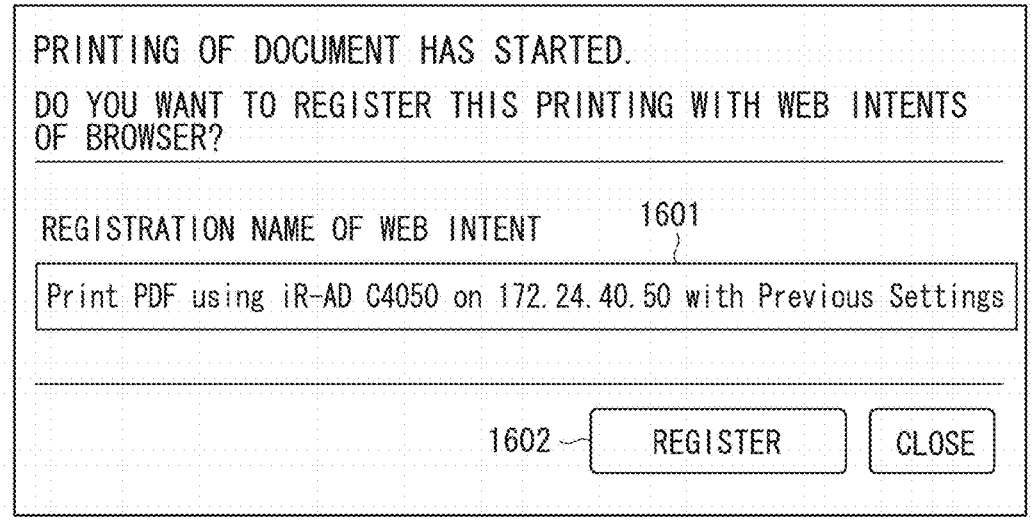
FIG. 16 illustrates an example of a screen for confirming Intent registration, which is displayed by the UA (the web browser), according to the second exemplary embodiment.

FIG. 16 illustrates an example of a display by the UA 106 (the web browser) based on the HTML document transmitted from the image forming apparatus 104 in step S1501. The HTML document according to the second exemplary embodiment does not contain the intent tag, unlike the above-described HTML document illustrated in FIG. 12B. The display screen illustrated in FIG. 16 includes a registration button 1602 for requesting the image forming apparatus 104 to transmit the HTML document that contains the intent tag to acquire and register the Intent, and a text box 1601 for confirming and editing the character string as the title of the intent tag.

In step S1502, upon detecting that the registration button 1602 is pressed, the UA 106 transmits an HTTP request that contains the content of the character string input in the text box 1601 to the image forming apparatus 104.

In step S1503, the image forming apparatus 104 transmits an HTML document containing an intent tag in which the character string of the title contained in the HTTP request transmitted in step S1502, and the print settings contained in the HTTP request transmitted in step S807 are reflected, to the browser 106. FIG. 17A illustrates an example of the intent tag contained in the HTML document transmitted to the UA 106 in step S1503. In step S1504, the UA 106 displays a screen illustrated in FIG. 17B. This is an example of a display screen based on the content of the HTML document received in step S1503. This screen provides a display that prompts the user to register the content of the intent tag contained in the HTML document received in step S1503 in the UA 106 as a Web Intent. Upon detecting that an OK button is pressed, this display disappears.

Upon receiving the HTML document in step S1503, the UA 106 displays a confirmation screen (not illustrated) for confirming to the user whether to register the content of this intent tag in the UA 106 as a Web Intent if the content of the intent tag contained in this document is not registered yet. Upon detecting that registration of the Web Intent is selected by the user via the confirmation screen, the UA 106 registers it within the UA 106.

FIG. 18 illustrates a modification of FIG. 16. The screen illustrated in FIG. 18 includes a setting portion 1801 for editing print setting parameters that should be contained in the "href" element in the intent tag, in addition to the text box 1601 for confirming and editing "title" and the registration button 1602. This screen is a screen generated by extending the content of the above-described screen illustrated in FIG. 16 by an extended description of the HTML document transmitted from the image forming apparatus 104 in step S1501.

In the example illustrated in FIG. 18, check boxes for the setting items "number of copies" and "binding direction" are unchecked so that they are not contained in the "href" element in the intent tag. On the other hand, check boxes for the setting items "page layout", "printing method", and "color mode" are checked so that they are contained in the "href" element. Further, because the setting items "printing orientation", "layout order", "sheet discharge method", and "stapling" are unchanged from the default settings, for example, they are configured so as to be unable to be changed.

As described above, in step S1503, the UA 106 receives the HTML document containing the intent tag in which the setting contents illustrated in FIG. 18 are reflected from the image forming apparatus 104. FIG. 19 illustrates an example of the content of the intent tag contained in this HTML document.

According to the present exemplary embodiment, registering an Intent in the UA 106 each time printing is performed with various kinds of print settings for a plurality of image forming apparatuses 104 results in a display of many candidates on the screen of the UA 106 for selecting a Web Intent. Therefore, hierarchal information can be also added to the description of the intent tag in the HTML document transmitted in step S1503 so that these candidates are displayed hierarchically on the selection screen of the UA 106. One example of the hierarchal information is adding a "parent" element to the intent tag, and specifying "href" of an Intent that will be a hierarchal parent. FIG. 20 illustrates an example in which the "parent" element is added to the intent tag. With this description, the Intent illustrated in FIG. 20 is registered so as to be displayed on a hierarchically lower level of "print.html" specified in the "parent" element on the selection screen of the UA 106. Further, as another example of the hierarchal information, a value of the "title" element can be also used as information for specifying the hierarchal structure. More specifically, an Intent may be identified as a hierarchically lower-level Intent by adding a character string unique to each Web Intent (for example, "with ECO mode") to a value of the "title" element of a Web Intent that will be a hierarchal parent (the character string "Print PDF using iR-AD C5035 on 172.24.50.35").

A third exemplary embodiment will be described as an example in which the service 103 in the Web Intents mechanism provides the "share" function with use of an electronic mail. In the following description of the present exemplary embodiment, a difference from the above-described exemplary embodiments will be described specifically.

Figure 21:
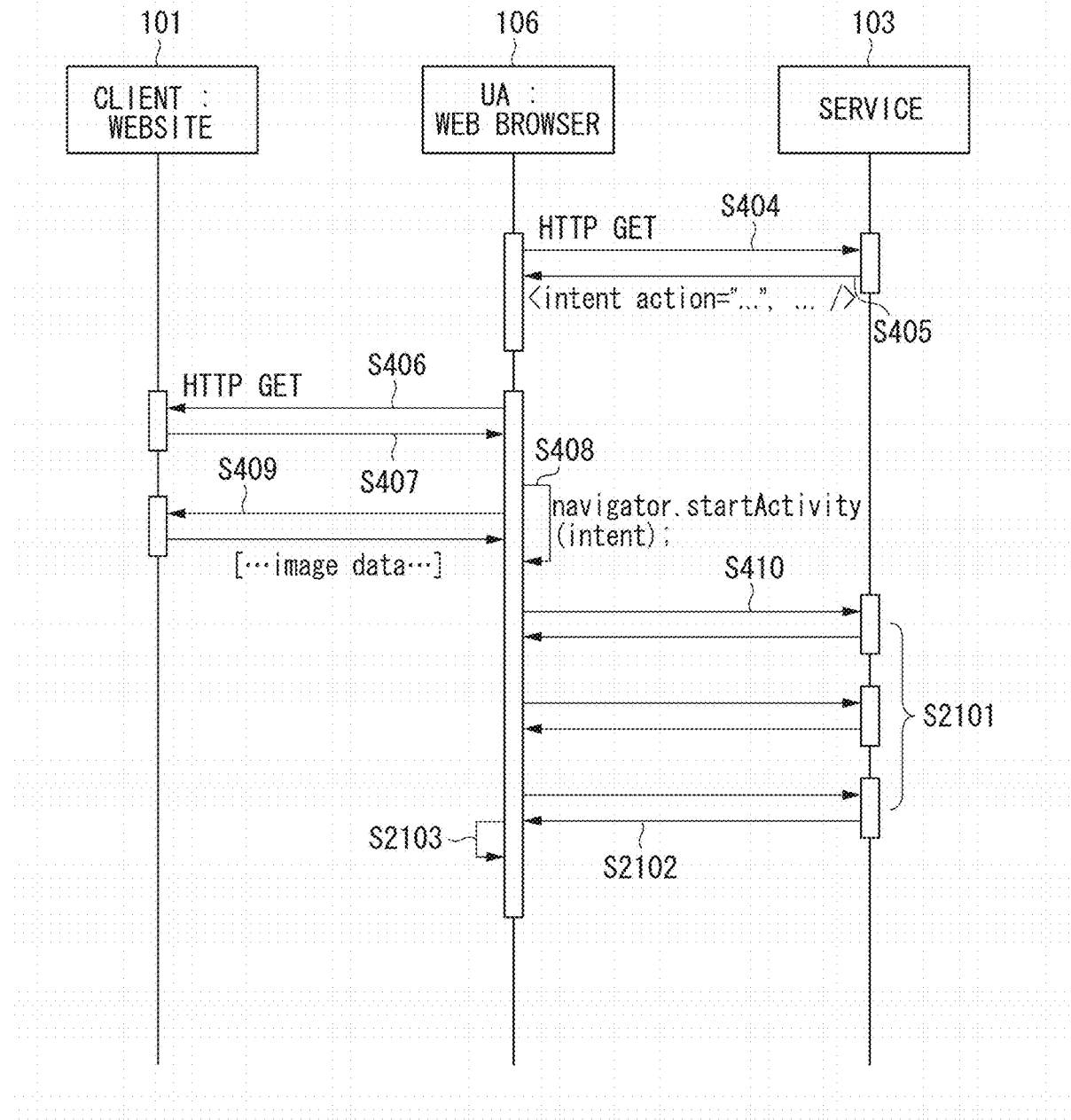
FIG. 21 is a sequence diagram illustrating an overview of an operation of the Web Intents mechanism according to a third exemplary embodiment.

FIG. 21 is a sequence diagram illustrating a basic operation regarding provision of the service with use of the Web Intents mechanism according to the present exemplary embodiment. In the following description, because this sequence is substantially similar to the sequence illustrated in FIG. 4 according to the above-described first exemplary embodiment, only a difference therefrom will be described below. In FIG. 21, a web browser is used as the UA 106. Further, the service 103 is a website that provides an electronic mail function as a web application, an electronic mail application in the apparatus on which the UA 106 operates, or the like.

FIG. 22 illustrates an example of an intent tag in an HTML document transmitted from the service 103 to the UA 106 in step S405 illustrated in FIG. 21. In this intent tag, for example, "http://webintents.org/share" is specified as a category (action) of the provided function. Further, "image/*", which covers any image data format, is specified as data that the provided function can handle. Further, "mail.html" is specified as a connection destination (URL) of the provided function.

Further, upon detecting that the Web Intent illustrated in FIG. 22 is selected by a user in step S408 illustrated in FIG. 21, in step S410, the UA 106 transmits an HTTP request according to the value of the "href" element in this intent tag.

Figure 23:
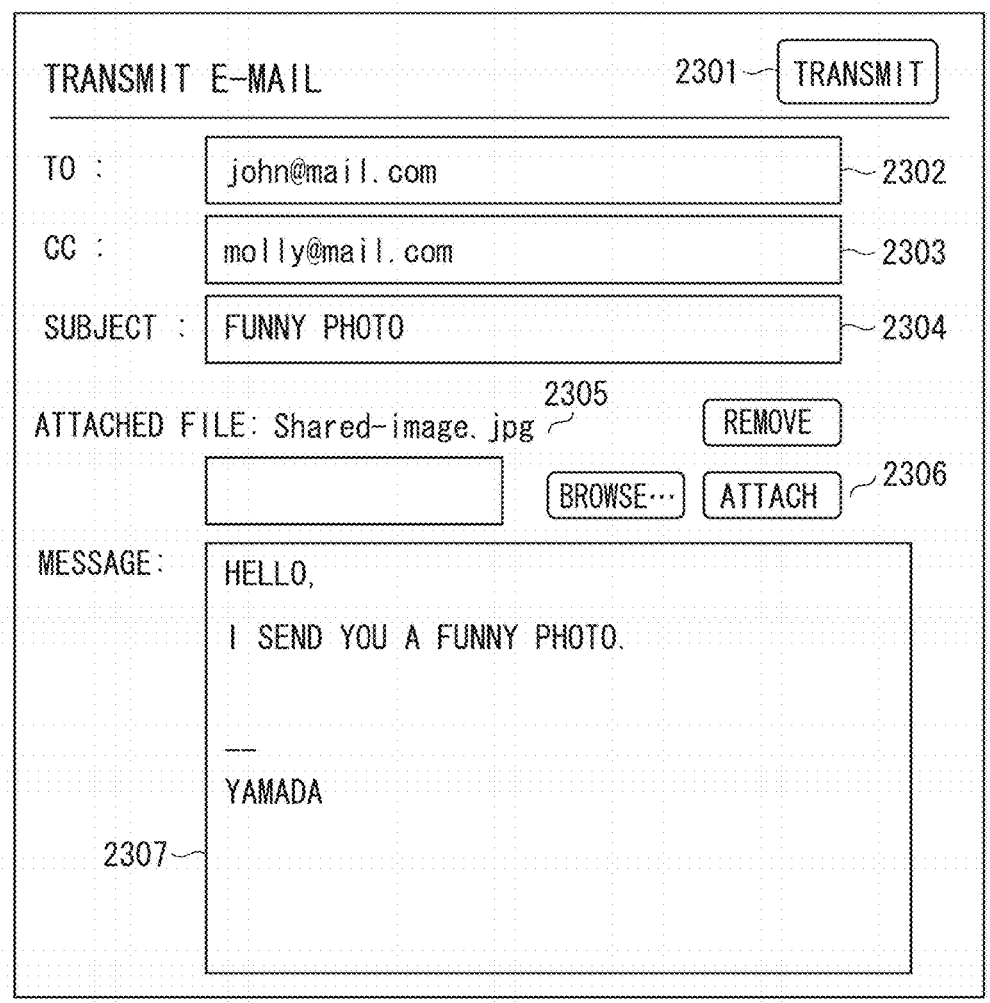
FIG. 23 illustrates an example of a display screen displayed by the UA 106 based on a reply from the service 103 according to the third exemplary embodiment.

In step S2101 illustrated in FIG. 21, the UA 106, for example, configures settings for carrying out the electronic mail service while communicating with the service 103. FIG. 23 illustrates an example of a display screen displayed by the UA 106 based on an HTML document returned by the service 103 in response to the HTTP request transmitted in step S410. In FIG. 23, text boxes 2302 and 2303 are used to input destinations (TO and CC) of an electronic mail, and a text box 2304 is used to input a subject (SUBJECT) of the electronic mail.

A file name 2305 indicates that image data acquired by the UA 106 from the client 101 in step S409 illustrated in FIG. 21 and transmitted to the service 103 as an Intent object is attached to the electronic mail. The service 103 automatically attaches the image data contained in the HTTP request as an Intent object to a newly created electronic mail when providing the electronic mail service according to the request transmitted in step S410 illustrated in FIG. 21.

A button 2306 is used to further add an attachment file to the electronic mail. A text area 2307 is used to input a body of the electronic mail. A button 2301 is used to transmit the electronic mail. Upon detecting that the button 2301 is pressed by the user, the UA 106 transmits the information input on the screen illustrated in FIG. 23 to the service 103, and thereby can instruct the service 103 to transmit the electronic mail.

The service 103 receives the request for transmitting the electronic mail from the UA 106, and transmits the electronic mail with the specified content contained therein and the specified file attached thereto to the specified destinations. Then, in step S2102, the service 103 transmits an HTML document for displaying that the electronic mail has been transmitted, to the UA 106.

FIG. 24A illustrates an example of a display screen displayed by the UA 106 based on the HTML document transmitted from the service 103 in step S2102. Further, FIG. 24B illustrates an example of an intent tag contained in the HTML document transmitted from the service 103 in step S2102.

An "href" element in the intent tag illustrated in FIG. 24B contains the electronic mail addresses of the destinations of the electronic mail, which are specified on the screen illustrated in FIG. 23. Further, a "title" element contains the electronic mail addresses of the destinations of the electronic mail, which are specified on the screen illustrated in FIG. 23. Upon receiving the HTML document that contains this intent tag, the UA 106 displays a confirmation screen to confirm to the user whether to register this Web Intent with the UA 106 if it is not registered yet. In step S2103, upon detecting that registration of the Web Intent is selected by the user, the UA 106 registers this Web Intent within the UA 106.

After this registration processing, the UA 106 can display a selection screen on which the user can select the Web Intent corresponding to the intent tag illustrated in FIG. 24B, when an instruction to "share" image data managed by the client 101 in the Web Intents mechanism is issued by the user. If this Web Intent is specified on the UA 106, the service 103 will return an HTML document for displaying an electronic mail setting screen with the destination information illustrated in FIG. 23 already set thereto and image data provided from the client 101 attached thereto, to the UA 106.

A fourth exemplary embodiment will be described as an example of processing in which the intent tag is not contained in the HTML document transmitted from the service 103 in step S2102 according to the third exemplary embodiment, and information of a screen that allows the user to edit the content of the Intent that should be additionally registered is contained therein.

FIG. 25 is a sequence diagram illustrating a basic operation regarding provision of the service with use of the Web Intents mechanism according to the present exemplary embodiment. In the following description, because this sequence is substantially similar to the above-described sequences illustrated in FIGS. 4 and 21, only a difference therefrom will be described below. In FIG. 25, a web browser is used as the UA 106. Further, the service 103 is a website that provides the electronic mail function as a web service, an electronic mail application in the apparatus on which the UA 106 operates, or the like.

Figure 26:
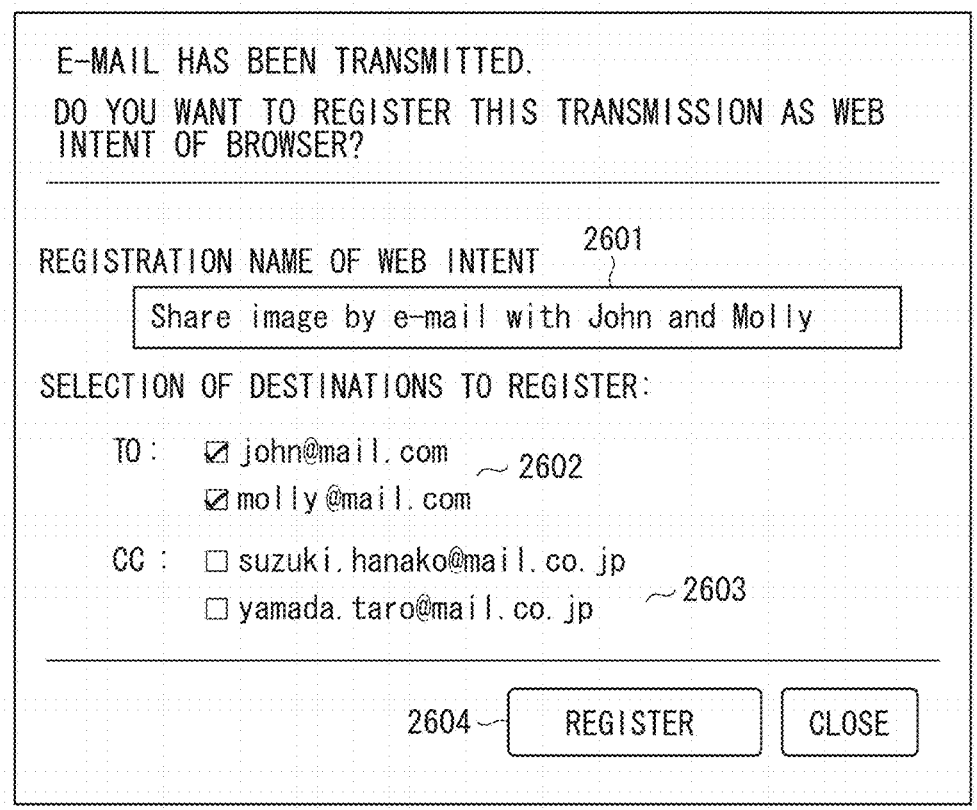
FIG. 26 illustrates an example of an edition screen displayed by the UA (the web browser) according to the fourth exemplary embodiment.

FIG. 26 illustrates an example of a display screen displayed by the UA 106 based on an HTML document transmitted from the service 103 in step S2102. The HTML document used in this display does not contain the intent tag for registration of the Intent.

A text box 2601 is used to input the content of the "title" element in the intent tag. Check boxes 2602 and 2603 are used to select contents to be reflected in the Web Intent that should be additionally registered from the list of the destinations of the electronic mail, which are contained as the contents set in step S2101. According to the present exemplary embodiment, the contents selected via these check boxes will be contained as values of the "href" element in the intent tag of the Web Intent that should be additionally registered. If execution of the Web Intent is realized by the service 103 according to these selected contents, these selected contents may be specified by another description in the intent tag, or an instruction for execution according to these selected contents may be also transmitted to the service 103 when the Web Intent is executed.

In step S2501, upon detecting that a registration button 2604 is pressed, the UA 106 transmits an HTTP request that contains the setting contents selected via the screen illustrated in FIG. 26 to the service 103. In step S2502, the service 103 returns an HTML document that contains the intent tag in which the setting contents in the received HTTP request are reflected to the UA 106.

FIG. 27 illustrates an example of the intent tag contained in the HTML document returned in step S2502. The content in the text box 2601 is described in the "title" element in the intent tag. Further, information for identifying the destinations selected via the check boxes 2602 and 2603 is contained in the "href" element in the intent tag.

Upon receiving the HTML document that contains the intent tag illustrated in FIG. 27, the UA 106 displays a screen for confirming to the user whether to register this Web Intent with the UA 106 if it is not registered yet. In step S2503, upon detecting that registration of the Web Intent is selected by the user, the UA 106 registers this Web Intent within the UA 106.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-103329 filed May 15, 2013, which is hereby incorporated by reference herein in its entirety.

What is claimed is:

1. An information processing terminal comprising, a memory storing instructions related to a web browser as a relay function for performing relaying between a client managing data and a service providing a function with use of the data managed by the client; and a processor which is capable of executing the instructions causing the information processing terminal to:
register first function information for calling the function provided by the service in the relay function;
display a list including the registered first function information;
issue a request for the data managed by the client to the service via a network when the first function information is selected from the displayed list;
specify to the service a processing content of the function corresponding to the first function information via a setting screen displayed based on information transmitted from the service after the request;

receive, from the service, HTML data in which information for an additional registration of second function information is described by using predetermined tags, wherein the second function information reflects at least a part of the specified content, and register, in the relay function, the second function information based on the information for the additional registration in response to a reception of the data.

2. The information processing terminal according to claim 1, wherein the function provided by the service according to the request is a function for sharing the data managed by the client via a network.

3. The information processing terminal according to claim 2, wherein the function provided by the service according to the request is a function for sharing the data managed by the client via the network by an electronic mail.

4. The information processing terminal according to claim 3, wherein the specified content includes a destination setting.

5. The information processing terminal according to claim 1, wherein the function provided by the service according to the request is a printing function.

6. The information processing terminal according to claim 5, wherein the specified content is a print setting that includes at least one setting among a layout setting, a color setting, a binding direction, a layout order of page(s), and a sheet discharge method.

7. The information processing terminal according to claim 1, wherein the network is the Internet.

8. The information processing terminal according to claim 1, wherein the client and the relay function are functions that operate on a same apparatus.

9. The information processing terminal according to claim 1, wherein the first and second function information registered in the relay function includes information that indicates a category of the provided function, a type of data that the provided function can handle, information that indicates a connection destination of the provided function, and information that indicates a title of the provided function.

10. The information processing terminal according to claim 1, wherein the second function information contains information partially changed from information contained in the first function information.

11. The information processing terminal according to claim 1, wherein the data in which the information for the additional registration of the second function information is described is a reply from the service about a result of execution of the function according to the request.

12. A method for a web browser as a relay function for performing relaying between a client managing data and a service providing a function with use of the data managed by the client, the method comprising:

registering first function information for calling the function provided by a service in the relay function;

displaying a list including the registered first function information;

issuing a request for the data managed by the client to the service via a network when the first function information is selected from the displayed list;

specifying to the service a processing content of the function corresponding to the first function information via a setting screen displayed based on information transmitted from the service after the request;

receiving, from the service, HTML data in which information for an additional registration of second function information is described by using predetermined tags, wherein the second function information reflects at least a part of the specified content, and registering, in the relay function, the second function information based on the information for the additional registration in response to a reception of the data.

13. The method according to claim 12, wherein the function provided by the service according to the request is a function for sharing the data managed by the client via a network.

14. The method according to claim 13, wherein the function provided by the service according to the request is a function for sharing the data managed by the client via the network by an electronic mail.

15. The method according to claim 14, wherein the specified content includes a destination setting.

16. The method according to claim 12, wherein the function provided by the service according to the request is a printing function.

17. The method according to claim 16, wherein the specified content is a print setting that includes at least one setting among a layout setting, a color setting, a binding direction, a layout order of page(s), and a sheet discharge method.

18. The method according to claim 12, wherein the network is the Internet.

19. The method according to claim 12, wherein the client and the relay function are functions that operate on a same apparatus.

20. The method according to claim 12, wherein the first and second function information registered in the relay function includes information that indicates a category of the provided function, a type of data that the provided function can handle, information that indicates a connection destination of the provided function, and information that indicates a title of the provided function.

21. The method according to claim 12, wherein the second function information contains information partially changed from information contained in the first function information.

22. The method according to claim 12, wherein the data in which the information for the additional registration of the second function information is described is a reply from the service about a result of execution of the function according to the request.

23. A network system comprising:

an information processing terminal having a memory storing instructions related to a web browser as a relay function of performing relaying between a client managing data and a service providing a function with use of the data managed by the client; and an information processing system as the service, wherein the information processing terminal includes a processor which is capable of executing the instructions causing the information processing terminal to:

register first function information for calling the function provided by the service in the relay function;

display a list including the registered first function information;

issue a request for the data managed by the client to the service via a network when the first function information is selected from the displayed list;

specify to the service a processing content of the function corresponding to the first function information via a setting screen displayed based on information transmitted from the service after the request, wherein the information processing system as the service provides, to the relay function, data in which information for an additional registration of second function information is described by using predetermined tags in response to a specification of the content at the information processing terminal, wherein the second function information reflects at least a part of the specified content, and wherein the instructions further cause the information processing terminal to:

receive, from the information processing system as the service, HTML data including the information for the additional registration of the second function information, and register, in the relay function, the second function information based on the information for the additional registration in response to a reception of the data.

24. The network system according to claim 23, wherein the client and the relay function are functions that operate on a same apparatus.

25. The network system according to claim 23, wherein the information processing system as the service provides, to the relay function, the data including the information for the additional registration of the second function information as a reply indicating a result of execution of the function according to the.

26. A non-transitory computer readable storage medium storing a computer program for causing a computer to execute a method for a web browser as a relay function for performing relaying between a client managing data and a service providing a function with use of the data managed by the client, the method comprising:

registering first function information for calling the function provided by the service, in the relay function;

displaying a list including the registered first function information;

issuing a request for the data managed by the client to the service via a network when the first function information is selected from the displayed list;

specifying to the service a processing content of the function corresponding to the first function information via a setting screen displayed based on information transmitted from the service after the request;

receiving, from the service, HTML data in which information for an additional registration of second function information is described by using predetermined tags, wherein the second function information reflects at least a part of the specified content, and registering, in the relay function, the second function information based on the information for the additional registration in response to a reception of the data.

* * * * *